US011991650B2

(12) United States Patent
Qu et al.

(10) Patent No.: US 11,991,650 B2
(45) Date of Patent: *May 21, 2024

(54) TECHNIQUES FOR SYNCHRONIZATION IN WIRELESS COMMUNICATIONS

(71) Applicant: Huawei Technologies Co., Ltd., Shenzhen (CN)

(72) Inventors: Bingyu Qu, Beijing (CN); Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/658,534

(22) Filed: Apr. 8, 2022

(65) Prior Publication Data

US 2022/0346045 A1    Oct. 27, 2022

Related U.S. Application Data

(63) Continuation of application No. 16/715,487, filed on Dec. 16, 2019, now Pat. No. 11,330,539, which is a
(Continued)

(30) Foreign Application Priority Data

May 4, 2017    (CN) .......................... 201710309975.6

(51) Int. Cl.
*H04W 56/00*    (2009.01)
*H04J 11/00*    (2006.01)
(Continued)

(52) U.S. Cl.
CPC ......... *H04W 56/0005* (2013.01); *H04J 11/00* (2013.01); *H04L 5/005* (2013.01);
(Continued)

(58) Field of Classification Search
CPC ... H04W 56/0005; H04W 56/00; H04J 11/00; H04L 27/26; H04L 27/2655
See application file for complete search history.

(56) References Cited

U.S. PATENT DOCUMENTS 5,544,150 A * 8/1996 Fujimoto ................ H04L 43/00
                                                           370/410
8,649,401 B2 * 2/2014 Luo ...................... H04J 11/0076
                                                           370/350
(Continued)

FOREIGN PATENT DOCUMENTS

CN    101075847 A    11/2007
CN    101821977 A     9/2010
(Continued)

OTHER PUBLICATIONS

3GPP TS 38.300 V0.2.0 (May 2017), 3rd Generation Partnership Project; Technical Specification Group Radio Access Network; NG Radio Access Network; Overall Description; Stage 2(Release 15), 33 pages.
(Continued)

*Primary Examiner* — Mehmood B. Khan
(74) *Attorney, Agent, or Firm* — Slater Matsil, LLP

(57) ABSTRACT

This application discloses a synchronization signal sending method and a related device. The method includes: generating, a first synchronization signal sequence and a second synchronization signal sequence, where the first synchronization signal sequence is a sequence obtained based on a first m-sequence, the second synchronization signal sequence is a sequence obtained based on a Gold sequence, the Gold sequence is generated based on a second m-sequence and a third m-sequence, and a generator polynomial of the first m-sequence is the same as a generator polynomial of the second m-sequence; mapping, the first synchronization signal sequence onto M subcarriers in a first time unit to obtain
(Continued)

a first synchronization signal, and mapping the second synchronization signal sequence onto M subcarriers in a second time unit to obtain a second synchronization signal, where M and N are positive integers greater than 1.

31 Claims, 7 Drawing Sheets

Related U.S. Application Data continuation of application No. 16/411,804, filed on May 14, 2019, now Pat. No. 10,652,843, which is a continuation of application No. PCT/CN2018/085740, filed on May 4, 2018.

(51) Int. Cl.
*H04L 5/00* (2006.01)
*H04L 27/26* (2006.01)

(52) U.S. Cl.
CPC .......... *H04L 27/26* (2013.01); *H04L 27/2613* (2013.01); *H04L 27/2655* (2013.01); *H04W 56/00* (2013.01)

(56) References Cited

U.S. PATENT DOCUMENTS

| | | | |
|---|---|---|---|
| 9,414,339 B2* | 8/2016 | Kim | H04W 56/00 |
| 9,883,533 B2* | 1/2018 | Froberg | H04W 48/08 |
| 10,212,680 B2* | 2/2019 | Li | H04W 56/00 |
| 10,320,600 B2* | 6/2019 | Lee | H04W 8/00 |
| 10,827,446 B2 | 11/2020 | Seo et al. | |
| 2002/0021718 A1* | 2/2002 | Kerhuel | H04B 7/2681 |
| | | | 370/509 |
| 2007/0026840 A1* | 2/2007 | Oga | H04B 1/0003 |
| | | | 455/348 |
| 2008/0167030 A1* | 7/2008 | Li | H04B 1/7105 |
| | | | 455/423 |
| 2009/0122839 A1 | 5/2009 | Luo et al. | |
| 2010/0172338 A1* | 7/2010 | Chou | H04W 56/002 |
| | | | 370/345 |
| 2010/0191703 A1* | 7/2010 | Masson | B60R 25/24 |
| | | | 707/621 |
| 2012/0147807 A1* | 6/2012 | Wang | H04W 56/0065 |
| | | | 370/312 |
| 2013/0016801 A1 | 1/2013 | Xia et al. | |
| 2015/0080040 A1* | 3/2015 | Chang | H04W 48/16 |
| | | | 455/500 |
| 2015/0319611 A1* | 11/2015 | Garcia | H04W 16/18 |
| | | | 370/329 |
| 2015/0350941 A1 | 12/2015 | You et al. | |
| 2016/0095077 A1* | 3/2016 | Kwak | H04L 27/2692 |
| | | | 370/280 |
| 2016/0242131 A1 | 8/2016 | Popovic et al. | |
| 2016/0360452 A1 | 12/2016 | Koorapaty et al. | |
| 2016/0372077 A1* | 12/2016 | Koo | G09G 3/20 |
| 2017/0195028 A1* | 7/2017 | Shimezawa | H04B 7/0626 |
| 2017/0273041 A1* | 9/2017 | Seo | H04W 76/14 |
| 2017/0280406 A1* | 9/2017 | Sheng | H04W 4/40 |
| 2018/0248642 A1* | 8/2018 | Si | H04L 5/0053 |
| 2018/0270770 A1* | 9/2018 | Shim | H04W 56/001 |
| 2019/0090126 A1* | 3/2019 | Hayashi | H04W 72/0446 |

FOREIGN PATENT DOCUMENTS

| | | |
|---|---|---|
| CN | 102209377 A | 10/2011 |
| CN | 103905363 A | 7/2014 |
| CN | 105307260 A | 2/2016 |
| CN | 105325038 A | 2/2016 |
| CN | 106465374 A | 2/2017 |
| CN | 106576319 A | 4/2017 |
| CN | 105409301 B | 7/2019 |
| CN | 110073616 A | 7/2019 |
| EP | 2316243 B1 | 9/2016 |
| JP | 2012004834 A | 1/2012 |
| WO | 2013056421 A1 | 4/2013 |
| WO | 2015115974 | 8/2015 |
| WO | 2016024754 A1 | 2/2016 |
| WO | 2017039293 A1 | 3/2017 |
| WO | 2018128867 A1 | 7/2018 |

OTHER PUBLICATIONS

3GPP TS 38.331 V0.0.2 (Mar. 2017), 3rd Generation Partnership Project; Technical Specification Group Radio Access Network; NR; Radio Resource Control (RRC); Protocol specification (Release 15), 13 pages.
Intel Corp, "NR PSS and SSS Design", 3GPP TSG RAN WG1 Meeting RAN1 #88bis, Spokane, WA, USA, Apr. 3-7, 2017, R1-1706156, 27 pages.
Intel Corp., "Correction of PSS Polynomial," 3GPP TSG RAN WG1 Meeting RAN1 #88bis, R1-1706807, Apr. 3-7, 2017, XP051253015, Spokane, WA, USA, 4 pages.
Intel Corp., "NR PSS and SSS Design," 3GPP TSG RAN WG1 Meeting RAN1 #88bis, R1-1704707, Apr. 3-7, 2017, XP051252394, Spokane, WA, USA, 23 pages.
Itri, "Considerations on Synchronization Sequence Design for New Radio", 3GPP TSG RAN WG1 Meeting #88bis, Spokane, USA, Apr. 3-7, 2017, R1-1705558, 9 pages.
LG Electronics, Discussion on NR cell identification [online], 3GPP TSG RAN WG4 #83 R4-1704534, May 2, 2017, 6 pages.
LG Electronics, "Summary of 88-12 email discussion on NR-SS design," 3GPP TSG RAN WG1 Meeting #88bis, R1-1704860, Spokane, Apr. 3-7, 2017, 5 pages.
Lin, Y., "Research on Synchronization and Omnidirectional Transmission in Massive MIMO Wireless Systems," Southeast University, Feb. 2017, 1 page.
Qualcomm, et al., "Initial Access Offline Outcome," 3GPP TSG RAN WG1 Meeting #88bis, R1-1706689, Spokane, WA, USA, Apr. 3-7, 2017, 3 pages.
Sarwate, et al., "Crosscorrelation Properties of Pseudorandom and Related Sequences," Proceedings of the IEEE, vol. 68, No., May 4, 1980, 27 pages.
Zhang, C, et al., Synchronization Sequence Generated by Modified Park Algorithm for NC-OFDM Transmission, IEEE Signal Processing Letters, vol. 22, No. 4, Apr. 2015, 5 pages.

* cited by examiner

Table 1 Primitive polynomial in a case of n=7

| Serial number | Primitive polynomial | Octal value | Serial number | Primitive polynomial | Octal value |
|---|---|---|---|---|---|
| 1 | 1 1 0 0 0 0 0 1 | 301 | 10 | 1 0 0 0 0 0 1 1 | 203# |
| 2 | 1 0 0 1 0 0 0 1 | 221 | 11 | 1 1 0 1 0 0 1 1 | 323 |
| 3 | 1 1 1 1 0 0 0 1 | 361 | 12 | 1 1 0 0 1 0 1 1 | 313# |
| 4 | 1 0 0 0 1 0 0 1 | 211# | 13 | 1 0 1 0 1 0 1 1 | 253 |
| 5 | 1 0 1 1 1 0 0 1 | 271 | 14 | 1 0 1 0 0 1 1 1 | 247 |
| 6 | 1 1 1 0 0 1 0 1 | 345# | 15 | 1 1 1 1 0 1 1 1 | 367# |
| 7 | 1 1 0 1 0 1 0 1 | 325# | 16 | 1 0 0 0 1 1 1 1 | 217# |
| 8 | 1 0 0 1 1 1 0 1 | 235# | 17 | 1 1 1 0 1 1 1 1 | 357 |
| 9 | 1 1 1 1 1 1 0 1 | 375 | 18 | 1 0 1 1 1 1 1 1 | 277# |

TECHNIQUES FOR SYNCHRONIZATION IN WIRELESS COMMUNICATIONS

CROSS-REFERENCE TO RELATED APPLICATIONS

This application is a continuation of U.S. patent application Ser. No. 16/715,487, filed on Dec. 16, 2019, which is a continuation of U.S. patent application Ser. No. 16/411,804, filed on May 14, 2019, now U.S. Pat. No. 10,652,843, which is a continuation of International Application No. PCT/CN2018/085740, filed on May 4, 2018, which claims priority to Chinese Patent Application No. 201710309975.6, filed on May 4, 2017. All of the aforementioned patent applications are hereby incorporated herein by reference in their entireties.

TECHNICAL FIELD

This application relates to the communications field, and in particular, to a synchronization signal sending method, a synchronization signal receiving method, and a related device.

BACKGROUND

In a next-generation radio access network (new radio, NR), a downlink base station completes coarse downlink time and frequency synchronization by using a synchronization signal. The synchronization signal includes a primary synchronization signal (PSS) and a secondary synchronization signal (SSS). User equipment (UE) may receive the primary synchronization signal and the secondary synchronization signal, to implement synchronization and obtain cell identification information. The user equipment first detects the primary synchronization signal to determine a center frequency and basic time and frequency synchronization information or parts of cell identification information, and then obtains the cell identification information by using the secondary synchronization signal. Usually, there may be a small quantity of possible different primary synchronization signals, for example, three primary synchronization signals or one primary synchronization signal. The 3rd Generation Partnership Project (3GPP) discussed generation of a primary synchronization signal by using a longest linear feedback shift register sequence. In addition, a secondary synchronization signal may also be generated based on a scrambled m-sequence or a Gold sequence. The m-sequence is short for a longest linear shift register sequence. Usually, to distinguish between the primary synchronization signal and the secondary synchronization signal, a primary synchronization signal sequence and a secondary synchronization signal sequence are different.

In a fifth-generation mobile communications technology (5G), a length of a new synchronization signal sequence may be greater than or equal to a length of a synchronization signal sequence in Long Term Evolution (LTE). An orthogonal frequency division multiplexing technology (OFDM) is used to transmit a synchronization signal. That is, a primary synchronization signal sequence is mapped onto a subcarrier in an OFDM system that is allocated to a primary synchronization signal, and a secondary synchronization signal sequence is mapped onto a subcarrier in the OFDM system that is allocated to a secondary synchronization signal.

In an existing solution, the primary synchronization signal and the secondary synchronization signal occupy one OFDM symbol, and sizes of occupied bandwidths are the same and are N, where N is an integer, for example, 127. When a network device detects a primary synchronization signal, a secondary synchronization signal in another cell or in a local cell interferes with detection of the primary synchronization signal.

SUMMARY

Embodiments of this application provide a synchronization signal sending method and a synchronization signal receiving method, so as to reduce correlation between a secondary synchronization signal and a primary synchronization signal, and reduce interference to the primary synchronization signal.

A first aspect of an embodiment of this application provides a synchronization signal sending method. The method includes: generating, by a network device, a first synchronization signal sequence that is obtained based on a first m-sequence and a second synchronization signal sequence that is obtained based on a first Gold sequence, where the first Gold sequence is generated based on a second m-sequence and a third m-sequence, a generator polynomial of the first m-sequence is the same as a generator polynomial of the second m-sequence, and the first m-sequence, the second m-sequence, and the third m-sequence each have a length of N, where N is a positive integer greater than 1; mapping, by the network device, the first synchronization signal sequence onto M subcarriers in a first time unit to obtain a first synchronization signal, and mapping the second synchronization signal sequence onto M subcarriers in a second time unit to obtain a second synchronization signal, where M is a positive integer greater than 1; and sending, by the network device, the first synchronization signal and the second synchronization signal. In this embodiment of this application, the network device generates the first synchronization signal sequence and the second synchronization signal sequence that have a small correlation value, namely, a primary synchronization signal sequence and a secondary synchronization signal sequence, to reduce cross-correlation between a secondary synchronization signal and a primary synchronization signal, thereby reducing interference caused to a primary synchronization signal by a secondary synchronization signal in another cell or in a local cell.

In a first implementation of the first aspect in this embodiment of this application, the first synchronization signal sequence is a sequence obtained based on the first m-sequence, and the generator polynomial of the first m-sequence $\{c(n)|n=0, 1, 2, \ldots, N-1\}$ is $g_1(x)=\sum_{i=0}^{K} a_i \cdot x^i$, where $0 \leq i \leq K$, $a_K=1$, $a_0=1$, and K is a positive integer greater than or equal to 1; and the first synchronization signal sequence and the first m-sequence satisfy $s(n)=1-2 \cdot c(n)$, $n=0, 1, 2, \ldots, N-1$, $c((n+K) \bmod N)=(\sum_{i=1}^{K-1} a_i \cdot c((n+i) \bmod N)+c(n)) \bmod 2$, $n=0, 1, 2, \ldots, N-K-1$, where $s(n)$ is the first synchronization signal sequence, and $c(n)$ is the first m-sequence. The first synchronization signal sequence is limited in this embodiment of this application, thereby improving implementability and operability of this embodiment of this application.

In a second implementation of the first aspect in this embodiment of this application, the second synchronization signal sequence is a sequence obtained based on the first Gold sequence, the first Gold sequence is generated based on a second m-sequence $\{f_1(n)|n=0, 1, 2, \ldots, N-1\}$ and a third m-sequence $\{f_2(n)|n=0, 1, 2, \ldots, N-1\}$, the generator polynomial of the second m-sequence is $g_2(x)=\sum_{i=0}^{K} b_i \cdot x^i$, and a generator polynomial of the third m-sequence is $g_3(x)=\sum_{i=0}^{K} c_i \cdot x^i$, where $b_K=1$, $b_0=1$, $c_K=1$, $c_0=1$, $0 \leq i \leq K$, and K is a positive integer greater than or equal to 1; and the first Gold sequence, the second m-sequence, and the third m-sequence satisfy $y_{m,k}(n)=1-2\cdot g_{m,k}(n)$, $g_{m,k}(n)=(f_1((n+m+k) \mod N)+f_2((n+k) \mod N)) \mod 2$, $n=0, 1, 2, \ldots, N-1$, $k=0, 1, 2, \ldots, N-1$, $m=0, 1, 2, \ldots, N-1$, where $y_{m,k}(n)$ is the second synchronization signal sequence, $y_{m,k}(n)$ is the first Gold sequence, m is a relative shift value between the second sequence $f_1(n)$ and the third sequence $f_2(n)$, and k is a cyclic shift value. The second synchronization signal sequence is defined in this embodiment of this application, thereby improving implementability and operability of this embodiment of this application.

In a third implementation of the first aspect in this embodiment of this application, the second synchronization signal sequence satisfies $y_{m,k}(n)=x_1((n+m+k) \mod N)\cdot x_2((n+k) \mod N)$, $x_1(n)=1-2\cdot f_1(n)$, $x_2(n)=1-2\cdot f_2(n)$, $n=0, 1, \ldots, N-1$, $k=0, 1, 2, \ldots, N-1$, $m=0, 1, 2, \ldots, N-1$, where $y_{m,k}(n)$ is the second synchronization signal sequence, $f_1(n)$ is the second m-sequence, and $f_2(n)$ is the third m-sequence. It may be understood that $x_1(n)=1-2\cdot f_1(n)$ and $x_2(n)=1-2\cdot f_2(n)$ are substituted into $y_{m,k}(n)=x_1((n+m+k) \mod N) x_2((n+k) \mod N)$, so as to learn that the second synchronization signal sequence $y_{m,k}(n)$ may also be represented as $y_{m,k}(n) = [1-2\cdot f_1((n+m+k) \mod N)]\cdot[1-2\cdot f_2((n+k) \mod N)]$ For simplicity, m+k may be denoted as $k_1$, that is, $k_1=m+k$. In this case, the second synchronization signal sequence $y_{m,k}(n)$ may also be represented as $y_{m,k}(n)=[1-2\cdot f_1((n+k_1) \mod N)]\cdot[1-2\cdot f_2((n+k) \mod N)]$, where $n=0, 1, \ldots, N-1$, $k=0, 1, 2, \ldots, N-1$, and $k_1=0, 1, 2, \ldots, 2(N-1)$. That is, n is an integer less than or equal to N−1, k is an integer less than or equal to N−1, and $k_1$ is an integer less than or equal to 2(N−1). Another condition that may be satisfied by the second synchronization signal is provided in this embodiment of this application, thereby increasing an implementation of this embodiment of this application.

A second aspect of an embodiment of this application provides a synchronization signal receiving method. The method includes: receiving, by user equipment, a first receive signal and a second receive signal; generating, by the user equipment, local synchronization signal sequences, where the local synchronization signal sequences includes a first local synchronization signal sequence and a second local synchronization signal sequence, the first local synchronization signal sequence is a sequence obtained based on a first m-sequence, the second local synchronization signal sequence is a sequence obtained based on a first Gold sequence, the first Gold sequence is generated based on a second m-sequence and a third m-sequence, a generator polynomial of the first m-sequence is the same as a generator polynomial of the second m-sequence, and the first m-sequence, the second m-sequence, and the third m-sequence each have a length of N, where N is a positive integer greater than 1; and processing, by the user equipment, the first receive signal and the second receive signal based on the local synchronization signal sequence. In this embodiment of this application, the user equipment processes the first receive signal and the second receive signal respectively by using the generated first local synchronization signal sequence and second local synchronization signal sequence that have a small correlation value, that is, the user equipment processes the first reception signal and the second reception signal respectively by using a local primary synchronization signal sequence and a local secondary synchronization signal sequence that have a small correlation value, to reduce a probability of false detection of a local secondary synchronization signal and a local primary synchronization signal, thereby improving performance of detecting the first receive signal and the second receive signal.

In a first implementation of the second aspect in this embodiment of this application, the processing, by the user equipment, the first receive signal and the second receive signal based on the local synchronization signal sequence includes: performing, by the user equipment, correlation processing on the first receive signal based on the first local synchronization signal sequence; and performing, by the user equipment, correlation processing on the second receive signal based on the second local synchronization signal sequence. A process of processing the first receive signal and the second receive signal is refined in this embodiment of this application, thereby perfecting steps in this embodiment of this application.

In a second implementation of the second aspect in this embodiment of this application, the performing, by the user equipment, correlation processing on the first receive signal based on the first local synchronization signal sequence includes: performing, by the user equipment, correlation processing on the first receive signal based on the first local synchronization signal sequence, where the first local synchronization signal sequence is the sequence obtained based on the first m-sequence, and the generator polynomial of the first m-sequence $\{c(n)|n=0, 1, 2, \ldots, N-1\}$ is $g_1(x)=\Sigma_{i=0}^{K}a_i\cdot x^i$, where $a_K=1$, $a_0=1$, K is a positive integer greater than or equal to 1, and $0\le i\le K$; and the first local synchronization signal sequence and the first m-sequence satisfy $s(n)=1-2\cdot c(n)$, $n=0, 1, 2, \ldots, N-1$, $c((n+K) \mod N)=(\Sigma_{i=1}^{K-1}a_i\cdot c((n+i) \mod N)+c(n)) \mod 2$, $n=0, 1, 2, \ldots, N-K-1$, where s(n) is the first local synchronization signal sequence, and c(n) is the first m-sequence. The first local synchronization signal sequence is limited in this embodiment of this application, thereby improving implementability and operability of this embodiment of this application.

In a third implementation of the second aspect in this embodiment of this application, the performing, by the user equipment, correlation processing on the second receive signal based on the second local synchronization signal sequence includes: performing, by the user equipment, correlation processing on the second receive signal based on the second local synchronization signal sequence, where the second local synchronization signal sequence is the sequence obtained based on the first Gold sequence, the first Gold sequence is generated based on a second m-sequence $\{f_1(n)|n=0, 1, 2, \ldots, N-1\}$ and a third m-sequence $\{f_2(n)|n=0, 1, 2, \ldots, N-1\}$, the generator polynomial of the second m-sequence is $g_2(x)=\Sigma_{i=0}^{K}b_i\cdot x^i$ and a generator polynomial of the third m-sequence is $g_3(x)=\Sigma_{i=0}^{K}c_i\cdot x^i$ where $b_K=1$, $b_0=1$, $c_K=1$, $c_0=1$, K is a positive integer greater than or equal to 1, and $0\le i\le K$; and the first Gold sequence, the second m-sequence, and the third m-sequence satisfy $y_{m,k}(n)=1-2\cdot g_{m,k}(n)$, $g_{m,k}(n)=(f_1((n+m+k) \mod N)+f_2((n+k) \mod N)) \mod 2$, $n=0, 1, 2, \ldots, N-1$, $k=0, 1, 2, \ldots, N-1$, $m=0, 1, 2, \ldots, N-1$, where $y_{m,k}(n)$ is the second synchronization signal sequence, $g_{m,k}(n)$ is the first Gold sequence, m is a relative shift value between the sequence $f_1(n)$ and the sequence $f_2(n)$, and k is a cyclic shift value. The first local synchronization signal sequence is limited in this embodiment of this application, thereby improving implementability and operability of this embodiment of this application.

In a fourth implementation of the second aspect in this embodiment of this application, the second local synchronization signal sequence satisfies $y_{m,k}(n)=x_1(n+m+k) \mod N)\cdot x_2((n+k) \mod N)$, $x_1(n)=1-2\cdot f_1(n)$, $x_2(n)=1-2\cdot f_2(n)$, $n=0, 1, \ldots, N-1$, $k=0, 1, 2, \ldots, N-1$, $m=0, 1, 2, \ldots, N-1$, where $y_{m,k}(n)$ is the second local synchronization signal sequence, $f_1(n)$ is the second m-sequence, and $f_2(n)$ is the third m-sequence. It may be understood that $x_1(n)=1-2\cdot f_1(n)$ and $x_2(n)=1-2\cdot f_2(n)$ are substituted into $y_{m,k}(n)=x_1((n+m+k) \bmod N)\cdot x_2((n+k) \bmod N)$, so as to learn that $y_{m,k}(n)$ may also be represented as $y_{m,k}(n)=[1-2\cdot f_1((n+m+k) \bmod N)]\cdot [1-2\cdot f_2((n+k) \bmod N)]$. For simplicity, m+k may be denoted as $k_1$, that is, $k_1=m+k$. In this case, $y_{m,k}(n)$ may also be represented as $y_{m,k}(n)=[1-2\cdot f_1((n+k_1) \bmod N)]\cdot [1-2\cdot f_2((n+k) \bmod N)]$, where $n=0, 1, \ldots, N-1$, k is an integer less than or equal to $N-1$, and $k_1$ is an integer less than or equal to $2(N-1)$. Another condition that may be satisfied by the second local synchronization signal is provided in this embodiment of this application, thereby increasing an implementation of this embodiment of this application.

A third aspect of an embodiment of this application provides a synchronization signal sending method. The method includes: generating, by a network device, a first synchronization signal sequence and a second synchronization signal sequence, where the first synchronization signal sequence is a sequence obtained based on a first Gold sequence, the first Gold sequence is a sequence generated based on a first m-sequence and a second m-sequence, the second synchronization signal sequence is a sequence obtained based on a second Gold sequence, the second Gold sequence is a sequence generated based on a third m-sequence and a fourth m-sequence, generator polynomials of the first m-sequence and the third m-sequence are the same, generator polynomials of the second m-sequence and the fourth m-sequence are the same, a relative shift value between the first m-sequence and the second m-sequence is $m_1$, a relative shift value between the third m-sequence and the fourth m-sequence is $m_2$, $m_1 \ne m_2 \pmod{N}$, and the first m-sequence, the second m-sequence, the third m-sequence, and the fourth m-sequence each have a length of N; mapping, by the network device, the first synchronization signal sequence onto M subcarriers in a first time unit to obtain a first synchronization signal, and mapping the second synchronization signal sequence onto M subcarriers in a second time unit to obtain a second synchronization signal, where M and N are positive integers greater than 1; and sending, by the network device, the first synchronization signal and the second synchronization signal. In this embodiment of this application, the network device generates the first synchronization signal sequence and the second synchronization signal sequence that have a small correlation value, namely, a primary synchronization signal sequence and a secondary synchronization signal sequence, to reduce cross-correlation between a secondary synchronization signal and a primary synchronization signal, thereby reducing interference caused to a primary synchronization signal by a secondary synchronization signal in another cell or in a local cell.

In a first implementation of the third aspect in this embodiment of this application, the first synchronization signal sequence is the sequence obtained based on the first Gold sequence, the first Gold sequence is the sequence generated based on a first m-sequence $f_1(n)$ and a second m-sequence $f_2(n)$, the second synchronization signal sequence is the sequence obtained based on the second Gold sequence, the second Gold sequence is generated based on a third m-sequence $f_3(n)$ and the fourth m-sequence $f_4(n)$, and the first Gold sequence, the first m-sequence, and the second m-sequence satisfy $y_{m,k}(n)=1-2\cdot g_{m,k}(n)$, $g_{m,k}(n)=(f_1((n+m+k) \bmod N)+f_2((n+k) \bmod N)) \bmod 2$, where $y_{m,k}(n)$ is the first synchronization signal sequence, $g_{m,k}(n)$ is the first Gold sequence, and the relative shift value between the first m-sequence and the second m-sequence is $m_1$. The second Gold sequence, the third m-sequence, and the fourth m-sequence satisfy $y_{m,k}(n)=1-2\cdot g_{m,k}(n)$, $g_{m,k}(n)=(f_3((n+m+k) \bmod N)+f_4((n+k) \bmod N)) \bmod 2$, where $y_{m,k}(n)$ the second synchronization signal sequence, $g_{m,k}(n)$ is the second Gold sequence, and the relative shift value between the third m-sequence and the fourth m-sequence is $m_2$, where $n=0, 1, 2, \ldots, N-1$, $k=0, 1, 2, \ldots, N-1$, $m=0, 1, 2, \ldots, N-1$, and k is a cyclic shift value. The generator polynomials of the first m-sequence and the third m-sequence are the same and are $g_1(x)=\Sigma_{i=0}^{K} a_i \cdot x^i$, $a_K=1$, $a_0=1$, the generator polynomials of the second m-sequence and the fourth m-sequence are the same and are $g_2(x)=\Sigma_{i=0}^{K} b_i \cdot x^i$, $b_K=1$, $b_0=1$, and $m_1 \cdot m_2 \pmod N$ is satisfied. The first synchronization signal sequence and the second synchronization signal sequence are limited in this embodiment of this application, thereby improving implementability and operability of this embodiment of this application.

In a second implementation of the third aspect in this embodiment of this application, the first synchronization signal sequence satisfies $y_{m,k}(n)=x_1((n+m+k) \bmod N)\cdot x_2((n+k) \bmod N)$, $x_1(n)=1-2\cdot f_1(n)$, $x_2(n)=1-2\cdot f_2(n)$, $n=0, 1, \ldots, N-1$, $k=0, 1, 2, \ldots, N-1$, $m=0, 1, 2, \ldots, N-1$, where $y_{m,k}(n)$ is the first synchronization signal sequence, $f_1(n)$ is the first m-sequence, and $f_2(n)$ is the second m-sequence. It may be understood that $x_1(n)=1-2\cdot f_1(n)$ and $x_2(n)=1-2\ f_2(n)$ are substituted into $y_{m,k}(n)=x_1((n+m+k) \bmod N)\cdot x_2((n+k) \bmod N)$, so as to learn that the first synchronization signal sequence $y_{m,k}(n)$ may also be represented as $y_{m,k}(n)=[1-2\cdot f_1((n+m+k) \bmod N)]\cdot [1-2\cdot f_2((n+k) \bmod N)]$. For simplicity, m+k may be denoted as $k_1$, that is, $k_1=m+k$. In this case, the first synchronization signal sequence $y_{m,k}(n)$ may also be represented as $y_{m,k}(n)=[1-2\cdot f_1((n+k_1) \bmod N)]\cdot [1-2\cdot f_2((n+k) \bmod N)]$, where $n=0, 1, \ldots, N-1$, $k=0, 1, 2, \ldots, N-1$, and $k_1=0, 1, 2, \ldots, 2(N-1)$. That is, n is an integer less than or equal to $N-1$, k is an integer less than or equal to $N-1$, and $k_1$ is an integer less than or equal to $2(N-1)$. Another condition that may be satisfied by the first synchronization signal is provided in this embodiment of this application, thereby increasing an implementation of this embodiment of this application.

A fourth aspect of an embodiment of this application provides a synchronization signal receiving method. The method includes: receiving, by user equipment, a first receive signal and a second receive signal; generating, by the user equipment, local synchronization signal sequences, where the local synchronization signal sequence includes a first local synchronization signal sequence and a second local synchronization signal sequence, the first local synchronization signal sequence is a sequence obtained based on a first Gold sequence, the first Gold sequence is a sequence generated based on a first m-sequence and a second m-sequence, the second local synchronization signal sequence is a sequence obtained based on a second Gold sequence, the second Gold sequence is a sequence generated based on a third m-sequence and a fourth m-sequence, generator polynomials of the first m-sequence and the third m-sequence are the same, and generator polynomials of the second m-sequence and the fourth m-sequence are the same, where a relative shift value between the first m-sequence and the second m-sequence is $m_1$, a relative shift value between the third m-sequence and the fourth m-sequence is $m_2$, $m_1 \ne m_2 \pmod N$, the first m-sequence, the second m-sequence, the third m-sequence, and the fourth m-sequence each have a length of N, and N is a positive integer greater than 1; and processing, by the user equipment, the first receive signal and the second receive signal based on the local synchronization signal sequence. In this embodiment of this application, the user equipment processes the first receive signal and the second receive signal respectively by using the generated first local synchronization signal sequence and second local synchronization signal sequence that have a small correlation value, that is, the user equipment processes the first reception signal and the second reception signal respectively by using a local primary synchronization signal sequence and a local secondary synchronization signal sequence, to reduce a probability of false detection of a local secondary synchronization signal and a local primary synchronization signal, thereby improving performance of detecting the first receive signal and the second receive signal.

In a first implementation of the fourth aspect in this embodiment of this application, the first local synchronization signal sequence is the sequence obtained based on the first Gold sequence, the first Gold sequence is the sequence generated based on a first m-sequence $f_1(n)$ and a second m-sequence $f_2(n)$, the second local synchronization signal sequence is the sequence obtained based on the second Gold sequence, the second Gold sequence is the sequence generated based on a third m-sequence $f_3(n)$ and a fourth m-sequence $f_4(n)$, and the first Gold sequence, the first m-sequence, and the second m-sequence satisfy $y_{m,k}(n)=1-2 \cdot g_{m,k}(n)$, $g_{m,k}(n)=(f_1((n+m+k) \bmod N)+f_2((n+k) \bmod N)) \bmod 2$, where $g_{m,k}(n)$ is the first Gold sequence, $y_{m,k}(n)$ is the first synchronization signal sequence, and the relative shift value between the first m-sequence and the second m-sequence is $m_1$. The second Gold sequence, the third m-sequence, and the fourth m-sequence satisfy $y_{m,k}(n)=1-2 \cdot g_{m,k}(n)$, $g_{m,k}(n)=(f_3((n+m+k) \bmod N)+f_4((n+k) \bmod N)) \bmod 2$, where $y_{m,k}(n)$ is the second synchronization signal sequence, $g_{m,k}(n)$ is the second Gold sequence, and the relative shift value between the third m-sequence and the fourth m-sequence is $m_2$, where $n=0, 1, 2, \ldots, N-1$, $k=0, 1, 2, \ldots, N-1$, $m=0, 1, 2, \ldots, N-1$, and k is a cyclic shift value. The generator polynomials of the first m-sequence and the third m-sequence are the same and are $g_1(x)=\Sigma_{i=0}^{K} a_i \cdot x^i$, $a_K=1$, $a_0=1$, the generator polynomials of the second m-sequence and the fourth m-sequence are the same and are $g_2(x)=\Sigma_{i=0}^{K} b_i \cdot x^i$, $b_K=1$, $b_0=1$, and $m_1 \neq m_2 (\bmod N)$ is satisfied. The first local synchronization signal sequence and the second local synchronization signal sequence are limited in this embodiment of this application, thereby improving implementability and operability of this embodiment of this application.

In a second implementation of the fourth aspect in this embodiment of this application, the first local synchronization signal sequence satisfies $y_{m,k}(n)=x_1((n+m+k) \bmod N) \cdot x_2((n+k) \bmod N)$, $x_1(n)=1-2 \cdot f_1(n)$, $x_2(n)=1-2 \cdot f_2(n)$, $n=0, 1, \ldots, N-1$, $k=0, 1, 2, \ldots, N-1$, $m=0, 1, 2, \ldots, N-1$, where $y_{m,k}(n)$ is the first local synchronization signal sequence, $f_1(n)$ is the first m-sequence, and $f_2(n)$ is the second m-sequence. It may be understood that $x_1(n)=1-2 \cdot f_1(n)$ and $x_2(n)=1-2 f_2(n)$ are substituted into $y_{m,k}(n)=x_1((n+m+k) \bmod N) \cdot x_2((n+k) \bmod N)$, so as to learn that the first local synchronization signal sequence $y_{m,k}(n)$ may also be represented as $y_{m,k}(n)=[1-2 \cdot f_1((n+m+k) \bmod N)][1-2 \cdot f_2((n+k) \bmod N)]$. For simplicity, m+k may be denoted as $k_1$, that is, $k_1=m+k$. In this case, the first local synchronization signal sequence $y_{m,k}(n)$ may also be represented as $y_{m,k}(n)=[1-2 \cdot f_1((n+k_1) \bmod N)] \cdot [1-2 \cdot f_2((n+k) \bmod N)]$, where $n=0, 1, \ldots, N-1$, $k=0, 1, 2, \ldots, N-1$, and $k_1=0, 1, 2, \ldots, 2(N-1)$. That is, n is an integer less than or equal to N−1, k is an integer less than or equal to N−1, and $k_1$ is an integer less than or equal to 2(N−1). Another condition that may be satisfied by the first local synchronization signal is provided in this embodiment of this application, thereby increasing an implementation of this embodiment of this application.

A fifth aspect of an embodiment of this application provides a synchronization signal sending method. The method includes: generating, by a network device, a first synchronization signal sequence and a second synchronization signal sequence, where the second synchronization signal sequence is a sequence obtained based on a first m-sequence and a second m-sequence, a relative shift value between the first m-sequence and the second m-sequence is m, a cyclic shift value is p, a value range of p does not include a cyclic shift value k strongly correlated to the first synchronization signal sequence, and the first m-sequence and the second m-sequence each have a length of N; mapping, by the network device, the first synchronization signal sequence onto M subcarriers in a first time unit to obtain a first synchronization signal, and mapping the second synchronization signal sequence onto M subcarriers in a second time unit to obtain a second synchronization signal, where M and N are positive integers greater than 1; and sending, by the network device, the first synchronization signal and the second synchronization signal. In this embodiment of this application, the network device generates the first synchronization signal sequence and the second synchronization signal sequence that have a small correlation value, namely, a primary synchronization signal sequence and a secondary synchronization signal sequence, to reduce cross-correlation between a secondary synchronization signal and a primary synchronization signal, thereby reducing interference caused to a primary synchronization signal by a secondary synchronization signal in another cell or in a local cell.

In a first implementation of the fifth aspect in this embodiment of this application, the second synchronization signal sequence may be a Gold sequence, and the Gold sequence is a sequence generated based on a first m-sequence $f_1(n)$ and a second m-sequence $f_2(n)$, and satisfies $y_{m,k}(n)=1-2 \cdot g_{m,k}(n)$, $g_{m,k}(n)=(f_1((n+m+k) \bmod N)+f_2((n+k) \bmod N)) \bmod 2$, $n=0, 1, 2, \ldots, N-1$, $k=0, 1, 2, \ldots, N-1$, $m=0, 1, 2, \ldots, N-1$, where $y_{m,k}(n)$ is the second synchronization signal sequence, $g_{m,k}(n)$ is the Gold sequence, and $f_1(n)$ and $f_2(n)$ are m-sequences. The second synchronization signal sequence is limited in this embodiment of this application, thereby improving implementability and operability of this embodiment of this application.

A sixth aspect of an embodiment of this application provides a synchronization signal receiving method. The method includes: receiving, by user equipment, a first receive signal and a second receive signal; generating, by the user equipment, local synchronization signal sequences, where the local synchronization signal sequences includes a first local synchronization signal sequence and a second local synchronization signal sequence, the second local synchronization signal sequence is a sequence obtained based on a first m-sequence and a second m-sequence, a relative shift value between the first m-sequence and the second m-sequence is m, a cyclic shift value is p, a value range of p does not include a cyclic shift value k strongly correlated to the first synchronization signal sequence, the first m-sequence and the second m-sequence each have a length of N, and N is a positive integer greater than 1; and processing, by the user equipment, the first receive signal and the second receive signal based on the local synchronization signal sequence. In this embodiment of this application, the user equipment processes the first receive signal and the second receive signal respectively by using the generated first local synchronization signal sequence and second local synchronization signal sequence that have a small correlation value, that is, the user equipment processes the first reception signal and the second reception signal respectively by using a local primary synchronization signal sequence and a local secondary synchronization signal sequence, to reduce a probability of false detection of a local secondary synchronization signal and a local primary synchronization signal, thereby improving performance of detecting the first receive signal and the second receive signal.

In a first implementation of the sixth aspect in this embodiment of this application, the second local synchronization signal sequence may be a Gold sequence, and the Gold sequence is generated based on a first m-sequence $f_1(n)$ and a second m-sequence $f_2(n)$, and satisfies $y_{m,k}(n)=1-2 \cdot g_{m,k}$, $g_{m,k}(n)=(f_1((n+m+k) \bmod N)+f_2((n+k) \bmod N)) \bmod 2$, $n=0, 1, 2, \ldots, N-1$, $k=0, 1, 2, \ldots, N-1$, $m=0, 1, 2, \ldots, N-1$, where $y_{m,k}(n)$ is the second local synchronization signal sequence, $g_{m,k}(n)$ is the Gold sequence, and $f_1(n)$ and $f_2(n)$ are m-sequences. The second local synchronization signal sequence is limited in this embodiment of this application, thereby improving implementability and operability of this embodiment of this application.

A seventh aspect of an embodiment of this application provides a network device. The network device includes: a generation unit, a mapping unit and a sending unit. The generation unit is configured to generate a first synchronization signal sequence and a second synchronization signal sequence. The first synchronization signal sequence is a sequence obtained based on a first m-sequence. The second synchronization signal sequence is a sequence obtained based on a first Gold sequence. The first Gold sequence is generated based on a second m-sequence and a third m-sequence. A generator polynomial of the first m-sequence is the same as a generator polynomial of the second m-sequence. The first m-sequence, the second m-sequence, and the third m-sequence each have a length of N. The mapping unit is configured to map the first synchronization signal sequence onto M subcarriers in a first time unit to obtain a first synchronization signal, and map the second synchronization signal sequence onto M subcarriers in a second time unit to obtain a second synchronization signal, where M and N are positive integers greater than 1. The sending unit is configured to send the first synchronization signal and the second synchronization signal. In this embodiment of this application, the network device generates the first synchronization signal sequence and the second synchronization signal sequence that have a small correlation value, namely, a primary synchronization signal sequence and a secondary synchronization signal sequence, to reduce cross-correlation between a secondary synchronization signal and a primary synchronization signal, thereby reducing interference caused to a primary synchronization signal by a secondary synchronization signal in another cell or in a local cell.

In a first implementation of the seventh aspect in this embodiment of this application, the first synchronization signal sequence is the sequence obtained based on the first m-sequence, and the generator polynomial of the first m-sequence $\{c(n)|n=0, 1, 2, \ldots, N-1\}$ is $g_1(x)=\Sigma_{i=0}^{K} a_i \cdot x^i$, where $a_K=1$, $a_0=1$, K is a positive integer greater than or equal to 1, and $0 \leq i \leq K$. The first synchronization signal sequence and the first m-sequence satisfy $s(n)=1-2 \cdot c(n)$, $n=0, 1, 2, \ldots, N-1$, $c((n+K) \bmod N)=(\Sigma_{i=0}^{K-1} a_i \cdot c((n+i) \bmod N)+c(n)) \bmod 2$, $n=0, 1, 2, \ldots, N-K-1$, where $s(n)$ is the first synchronization signal sequence, and $c(n)$ is the first m-sequence. The first synchronization signal sequence is limited in this embodiment of this application, thereby improving implementability and operability of this embodiment of this application.

In a second implementation of the seventh aspect in this embodiment of this application, the second synchronization signal sequence is a sequence obtained based on the first Gold sequence, the first Gold sequence is generated based on a second m-sequence $\{f_1(n)|n=0, 1, 2, \ldots, N-1\}$ and a third m-sequence $\{f_2(n)|n=0, 1, 2, \ldots, N-1\}$. The generator polynomial of the second m-sequence is $g_2(x)=\Sigma_{i=0}^{K} b_i \cdot x^i$, and a generator polynomial of the third m-sequence is $g_3(x)=\Sigma_{i=0}^{K} c_i \cdot x^i$, where $b_K=1$, $b_0=1$, $c_K=1$, $c_0=1$, K is a positive integer greater than or equal to 1, and $0 \leq i \leq K$. The first Gold sequence, the second m-sequence, and the third m-sequence satisfy $y_{m,k}(n)=1-2 \cdot g_{m,k}(n)$, $g_{m,k}(n)=(f_1((n+m+k) \bmod N)+f_2((n+k) \bmod N)) \bmod 2$, $n=0, 1, 2, \ldots, N-1$, $k=0, 1, 2, \ldots, N-1$, $m=0, 1, 2, \ldots, N-1$, where $y_{m,k}(n)$ is the second synchronization signal sequence, $g_{m,k}(n)$ is the first Gold sequence, m is a relative shift value between the sequence $f_1(n)$ and the sequence $f_2(n)$, and k is a cyclic shift value. The second synchronization signal sequence is limited in this embodiment of this application, thereby improving implementability and operability of this embodiment of this application.

In a third implementation of the seventh aspect in this embodiment of this application, the second synchronization signal sequence satisfies $y_{m,k}(n)=x_1((n+m+k) \bmod N) \cdot x_2((n+k) \bmod N)$, $x_1(n)=1-2 \cdot f_1(n)$, $x_2(n)=1-2 \cdot f_2(n)$, $n=0, 1, \ldots, N-1$, $k=0, 1, 2, \ldots, N-1$, $m=0, 1, 2, \ldots, N-1$, where $y_{m,k}(n)$ is the second synchronization signal sequence, $f_1(n)$ is the second m-sequence, and $f_2(n)$ is the third m-sequence. It may be understood that $x_1(n)=1-2 \cdot f_1(n)$ and $x_2(n)=1-2 \cdot f_2(n)$ are substituted into $y_{m,k}(n)=x_1((n+m+k) \bmod N) \cdot x_2((n+k) \bmod N)$, so as to learn that the second synchronization signal sequence $y_{m,k}(n)$ may also be represented as $y_{m,k}(n)=[1-2 \cdot (f_1(n+m+k) \bmod N)] \cdot [1-2 \cdot (f_2(n+k) \bmod N)]$. For simplicity, m+k may be denoted as $k_1$, that is, $k_1=m+k$. In this case, the second synchronization signal sequence $y_{m,k}(n)$ may also be represented as $y_{m,k}(n)=[1-2 \cdot f_1((n+k_1) \bmod N)] \cdot [1-2 \cdot f_2((n+k) \bmod N)]$, where $n=0, 1, \ldots, N-1$, $k=0, 1, 2, \ldots, N-1$, and $k_1=0, 1, 2, \ldots, 2(N-1)$. That is, n is an integer less than or equal to N-1, k is an integer less than or equal to N-1, and $k_1$ is an integer less than or equal to 2(N-1). Another condition that may be satisfied by the second synchronization signal is provided in this embodiment of this application, thereby increasing an implementation of this embodiment of this application.

An eighth aspect of an embodiment of this application provides user equipment. The user equipment includes: a receiving unit, configured to receive a first receive signal and a second receive signal. A generation unit, configured to generate local synchronization signal sequences, where the local synchronization signal sequences includes a first local synchronization signal sequence and a second local synchronization signal sequence. The first local synchronization signal sequence is a sequence obtained based on a first m-sequence, the second local synchronization signal sequence is a sequence obtained based on a first Gold sequence, the first Gold sequence is generated based on a second m-sequence and a third m-sequence. A generator polynomial of the first m-sequence is the same as a generator polynomial of the second m-sequence, and the first m-sequence, the second m-sequence, and the third m-sequence each have a length of N, where N is a positive integer greater than 1; and a processing unit, configured to process the first receive signal and the second receive signal based on the local synchronization signal sequence. In this embodiment of this application, the user equipment processes the first receive signal and the second receive signal respectively by using the generated first local synchronization signal sequence and second local synchronization signal sequence that have a small correlation value, that is, the user equipment processes the first reception signal and the second reception signal respectively by using a local primary synchronization signal sequence and a local secondary synchronization signal sequence, to reduce a probability of false detection of a local secondary synchronization signal and a local primary synchronization signal, thereby improving performance of detecting the first receive signal and the second receive signal.

In a first implementation of the eighth aspect in this embodiment of this application, the processing unit includes: a first processing subunit, configured to perform correlation processing on the first receive signal based on the first local synchronization signal sequence; and a second processing subunit, configured to perform correlation processing on the second receive signal based on the second local synchronization signal sequence. A process of processing the first receive signal and the second receive signal is refined in this embodiment of this application, thereby perfecting steps in this embodiment of this application.

In a second implementation of the eighth aspect in this embodiment of this application, the first processing subunit is specifically configured to perform correlation processing on the first receive signal based on the first local synchronization signal sequence. The first local synchronization signal sequence is the sequence obtained based on the first m-sequence, and the generator polynomial of the first m-sequence $\{c(n)|n=0, 1, 2, \ldots, N-1\}$ is $g_1(x)=\Sigma_{i=0}^{K}a_i \cdot x^i$, where $a_K=1$, $a_0=1$, K is a positive integer greater than or equal to 1, and $0 \leq i \leq K$. The first local synchronization signal sequence and the first m-sequence satisfy $s(n)=1-2 \cdot c(n)$, $n=0, 1, 2, \ldots, N-1$, $c((n+K) \mod N)=(\Sigma_{i=0}^{K-1}a_i \cdot c((n+i) \mod N)+c(n)) \mod 2$, $n=0, 1, 2, \ldots, N-K-1$, where $s(n)$ is the first local synchronization signal sequence, and $c(n)$ is the first m-sequence. The first local synchronization signal sequence is limited in this embodiment of this application, thereby improving implementability and operability of this embodiment of this application.

In a third implementation of the eighth aspect in this embodiment of this application, the second processing subunit is specifically configured to perform correlation processing on the second receive signal based on the second local synchronization signal sequence. The second local synchronization signal sequence is the sequence obtained based on the first Gold sequence, the first Gold sequence is generated based on a second m-sequence $\{f_1(n)|n=0, 1, 2, \ldots, N-1\}$ and a third m-sequence $\{f_2(n)|n=0, 1, 2, \ldots, N-1\}$, the generator polynomial of the second m-sequence is $g_2(x)=\Sigma_{i=0}^{K}b_i \cdot x^i$, and a generator polynomial of the third m-sequence is $g_3(x)=\Sigma_{i=0}^{K}c_i \cdot x^i$, where $b_K=1$, $b_0=1$, $c_K=1$, $c_0=1$, K is a positive integer greater than or equal to 1, and $0 \leq i \leq K$. The first Gold sequence, the second m-sequence, and the third m-sequence satisfy $y_{m,k}(n)=1-2 \cdot g_{m,k}(n)$, $g_{m,k}(n)=(f_1((n+m+k) \mod N)+f_2((n+k) \mod N)) \mod 2$, $n=0, 1, 2, \ldots, N-1$, $k=0, 1, 2, \ldots, N-1$, $m=0, 1, 2, \ldots, N-1$, where $y_{m,k}(n)$ is the second synchronization signal sequence, $g_{m,k}(n)$ is the first Gold sequence, m is a relative shift value between the sequence $f_1(n)$ and the sequence $f_2(n)$, and k is a cyclic shift value. The first local synchronization signal sequence is limited in this embodiment of this application, thereby improving implementability and operability of this embodiment of this application.

In a fourth implementation of the eighth aspect in this embodiment of this application, the second local synchronization signal sequence satisfies $y_{m,k}(n)=x_1((n+m+k) \mod N) \cdot x_2((n+k) \mod N)$, $x_1(n)=1-2 \cdot f_1(n)$, $x_2(n)=1-2 \cdot f_2(n)$, $n=0, 1, \ldots, N-1$, $k=0, 1, 2, \ldots, N-1$, $m=0, 1, 2, \ldots, N-1$, where $y_{m,k}(n)$ is the second local synchronization signal sequence, $f_1(n)$ is the second m-sequence, and $f_2(n)$ is the third m-sequence. It may be understood that $x_1(n)=1-2 \cdot f_1(n)$ and $x_2(n)=1-2 \cdot f_2(n)$ are substituted into $y_{m,k}(n) \cdot x_1((n+m+k) \mod N) \cdot x_2((n+k) \mod N)$, so as to learn that the second local synchronization signal sequence $y_{m,k}(n)$ may also be represented as $y_{m,k}(n)=[1-2 \cdot f_1((n+m+k) \mod N)] \cdot [1-2 \cdot f_2((n+k) \mod N)]$. For simplicity, m+k may be denoted as $k_1$, that is, $k_1=m+k$. In this case, the second local synchronization signal sequence $y_{m,k}(n)$ may also be represented as $y_{m,k}(n)=[1-2 \cdot f_1((n+k_1) \mod N)] \cdot [1-2 \cdot f_2((n+k) \mod N)]$, where $n=0, 1, \ldots, N-1$, $k=0, 1, 2, \ldots, N-1$, and $k_1=0, 1, 2, \ldots, 2(N-1)$. That is, n is an integer less than or equal to N−1, k is an integer less than or equal to N−1, and $k_1$ is an integer less than or equal to 2(N−1). Another condition that may be satisfied by the second local synchronization signal is provided in this embodiment of this application, thereby increasing an implementation of this embodiment of this application.

A ninth aspect of an embodiment of this application provides a network device. The network device includes: a generation unit, configured to generate a first synchronization signal sequence and a second synchronization signal sequence, where the first synchronization signal sequence is a sequence obtained based on a first Gold sequence, the first Gold sequence is a sequence generated based on a first m-sequence and a second m-sequence, the second synchronization signal sequence is a sequence obtained based on a second Gold sequence, the second Gold sequence is a sequence generated based on a third m-sequence and a fourth m-sequence, generator polynomials of the first m-sequence and the third m-sequence are the same, generator polynomials of the second m-sequence and the fourth m-sequence are the same, a relative shift value between the first m-sequence and the second m-sequence is $m_1$, a relative shift value between the third m-sequence and the fourth m-sequence is $m_2$, $m_1 \neq m_2 (\mod N)$, and the first m-sequence, the second m-sequence, the third m-sequence, and the fourth m-sequence each have a length of N; a mapping unit, configured to: map the first synchronization signal sequence onto M subcarriers in a first time unit to obtain a first synchronization signal, and map the second synchronization signal sequence onto M subcarriers in a second time unit to obtain a second synchronization signal, where M and N are positive integers greater than 1; and a sending unit, configured to send the first synchronization signal and the second synchronization signal. In this embodiment of this application, the network device generates the first synchronization signal sequence and the second synchronization signal sequence that have a small correlation value, namely, a primary synchronization signal sequence and a secondary synchronization signal sequence, to reduce cross-correlation between a secondary synchronization signal and a primary synchronization signal, thereby reducing interference caused to a primary synchronization signal by a secondary synchronization signal in another cell or in a local cell.

In a first implementation of the ninth aspect in this embodiment of this application, the first synchronization signal sequence is a sequence obtained based on the first Gold sequence, the first Gold sequence is generated based on a first m-sequence $f_1(n)$ and a second m-sequence $f_2(n)$, the second synchronization signal sequence is the sequence obtained based on the second Gold sequence, the second Gold sequence is the sequence generated based on a third m-sequence $f_3(n)$ and a fourth m-sequence $f_4(n)$, and the first Gold sequence, the first m-sequence, and the second m-sequence satisfy $y_{m,k}(n)=1-2 \cdot g_{m,k}(n)$, $g_{m,k}(n)=(f_1((n+m+k) \mod N)+f_2((n+k) \mod N)) \mod 2$, where $y_{m,k}(n)$ is the first synchronization signal sequence, $g_{m,k}(n)$ is the first Gold sequence, and the relative shift value between the first m-sequence and the second m-sequence is $m_1$. The second Gold sequence, the third m-sequence, and the fourth m-sequence satisfy $y_{m,k}(n)=1-2 \cdot g_{m,k}(n)$, $g_{m,k}(n)=(f_3((n+m+k) \mod N)+f_4((n+k) \mod N)) \mod 2$, where $g_{m,k}(n)$ is the second Gold sequence, and the relative shift value between the third m-sequence and the fourth m-sequence is $m_2$, where n=0, 1, 2, ..., N−1, k=0, 1, 2, ..., N−1, m=0, 1, 2, ..., N−1, and k is a cyclic shift value. The generator polynomials of the first m-sequence and the third m-sequence are the same and are $g_1(x)=\Sigma_{i=0}^{K} a_i \cdot x^i$, $a_K=1$, $a_0=1$, the generator polynomials of the second m-sequence and the fourth m-sequence are the same and are $g_2(x)=\Sigma_{i=0}^{K} b_i \cdot x^i$, $b_K=1$, $b_0=1$, and $m_1 \neq m_2 (\mod N)$ is satisfied. The first synchronization signal sequence and the second synchronization signal sequence are limited in this embodiment of this application, thereby improving implementability and operability of this embodiment of this application.

In a second implementation of the ninth aspect in this embodiment of this application, the first synchronization signal sequence satisfies $y_{m,k}(n)$ $x_1((n+m+k) \mod N) \cdot x_2((n+k) \mod N)$, $x_1(n)=1-2 \cdot f_1(n)$, $x_2(n)=1-2 \cdot f_2(n)$, n=0, 1, ..., N−1, k=0, 1, 2, ..., N−1, m=0, 1, 2, ..., N−1, where $y_{m,k}(n)$ is the first synchronization signal sequence, $f_1(n)$ is the first m-sequence, and $f_2(n)$ is the second m-sequence. It may be understood that $x_1(n)=1-2 \cdot f_1(n)$ and $x_2(n)=1-2 \cdot f_2(n)$ are substituted into $y_{m,k}(n)=x_1((n+m+k) \mod N) \cdot x_2((n+k) \mod N)$, so as to learn that the first synchronization signal sequence $y_{m,k}(n)$ may also be represented as $y_{m,k}(n)=[1-2 \cdot f_1((n+m+k) \mod N)] \cdot [1-2 \cdot f_2((n+k) \mod N)]$. For simplicity, m+k may be denoted as $k_1$, that is, $k_1=m+k$. In this case, the first synchronization signal sequence $y_{m,k}(n)$ may also be represented as $y_{m,k}(n)=[1-2 \cdot f_1((n+k_1) \mod N)] \cdot [1-2 \cdot f_2((n+k) \mod N)]$, where n=0, 1, ..., N−1, k=0, 1, 2, ..., N−1, and $k_1$=0, 1, 2, ..., 2(N−1). That is, n is an integer less than or equal to N−1, k is an integer less than or equal to N−1, and $k_1$ is an integer less than or equal to 2(N−1). Another condition that may be satisfied by the first synchronization signal is provided in this embodiment of this application, thereby increasing an implementation of this embodiment of this application.

A tenth aspect of an embodiment of this application provides user equipment. The user equipment includes: a receiving unit, configured to receive a first receive signal and a second receive signal; a generation unit, configured to generate local synchronization signal sequences, where the local synchronization signal sequences includes a first local synchronization signal sequence and a second local synchronization signal sequence, the first local synchronization signal sequence is a sequence obtained based on a first Gold sequence, the first Gold sequence is a sequence generated based on a first m-sequence and a second m-sequence, the second local synchronization signal sequence is a sequence obtained based on a second Gold sequence, the second Gold sequence is a sequence generated based on a third m-sequence and a fourth m-sequence, generator polynomials of the first m-sequence and the third m-sequence are the same, and generator polynomials of the second m-sequence and the fourth m-sequence are the same, where a relative shift value between the first m-sequence and the second m-sequence is $m_1$, a relative shift value between the third m-sequence and the fourth m-sequence is $m_2$, $m_1 \neq m_2 (\mod N)$, the first m-sequence, the second m-sequence, the third m-sequence, and the fourth m-sequence each have a length of N, and N is a positive integer greater than 1; and a processing unit, configured to process the first receive signal and the second receive signal based on the local synchronization signal sequence. In this embodiment of this application, the user equipment processes the first receive signal and the second receive signal respectively by using the generated first local synchronization signal sequence and second local synchronization signal sequence that have a small correlation value, that is, the user equipment processes the first reception signal and the second reception signal respectively by using a local primary synchronization signal sequence and a local secondary synchronization signal sequence, to reduce a probability of false detection of a local secondary synchronization signal and a local primary synchronization signal, thereby improving performance of detecting the first receive signal and the second receive signal.

In a first implementation of the tenth aspect in this embodiment of this application, the first local synchronization signal sequence is a sequence obtained based on the first Gold sequence, the first Gold sequence is generated based on a first m-sequence $f_1(n)$ and the second m-sequence $f_2(n)$, the second local synchronization signal sequence is the sequence obtained based on the second Gold sequence, the second Gold sequence is the sequence generated based on a third m-sequence $f_3(n)$ and the fourth m-sequence $f_4(n)$, and the first Gold sequence, the first m-sequence, and the second m-sequence satisfy $y_{m,k}(n)=1-2 \cdot g_{m,k}(n)$, $g_{m,k}(n)=(f_1((n+m+k) \mod N)+f_2((n+k) \mod N)) \mod 2$, where $y_{m,k}(n)$ is the first synchronization signal sequence, $g_{m,k}(n)$ is the first Gold sequence, and the relative shift value between the first m-sequence and the second m-sequence is $m_1$. The second Gold sequence, the third m-sequence, and the fourth m-sequence satisfy $y_{m,k}(n)=1-2 \cdot g_{m,k}(n)$, $g_{m,k}(n)=(f_3((n+m+k) \mod N)+f_4((n+k) \mod N)) \mod 2$, where $y_{m,k}(n)$ is the second synchronization signal sequence, $g_{m,k}(n)$ is the second Gold sequence, and the relative shift value between the third m-sequence and the fourth m-sequence is $m_2$, where n=0, 1, 2, ..., N−1, k=0, 1, 2, ..., N−1, m=0, 1, 2, ..., N−1, and k is a cyclic shift value. The generator polynomials of the first m-sequence and the third m-sequence are the same and are $g_1(x)=\Sigma_{i=0}^{K} a_i \cdot x^i$, $a_K=1$, $a_0=1$, the generator polynomials of the second m-sequence and the fourth m-sequence are the same and are $g_2(x)=\Sigma_{i=0}^{K} b_i \cdot x^i$, $b_K=1$, $b_0=1$, and $m_1 \neq m_2 (\mod N)$ is satisfied. The first local synchronization signal sequence and the second local synchronization signal sequence are limited in this embodiment of this application, thereby improving implementability and operability of this embodiment of this application.

In a second implementation of the tenth aspect in this embodiment of this application, the first local synchronization signal sequence satisfies $y_{m,k}(n)=x_1((n+m+k) \mod N) \cdot x_2((n+k) \mod N)$, $x_1(n)=1-2 \cdot f_1(n)$, $x_2(n)=1-2 \cdot f_2(n)$, n=0, 1, ..., N−1, k=0, 1, 2, ..., N−1, m=0, 1, 2, ..., N−1, where $y_{m,k}(n)$ is the first local synchronization signal sequence, $f_1(n)$ is the first m-sequence, and $f_2(n)$ is the second m-sequence. It may be understood that $x_1(n)=1-2 \cdot f_1(n)$ and $x_2(n)=1-2 f_2(n)$ are substituted into $y_{m,k}(n)=x_1((n+m+k) \mod N) \cdot x_2((n+k) \mod N)$, so as to learn that the first local synchronization signal sequence $y_{m,k}(n)$ may also be represented as $y_{m,k}(n)=[1-2 \cdot f_1((n+m+k) \mod N)] \cdot [1-2 \cdot f_2((n+k) \mod N)]$. For simplicity, m+k may be denoted as $k_1$, that is, $k_1=m+k$. In this case, the first local synchronization signal sequence $y_{m,k}(n)$ may also be represented as $y_{m,k}(n)=[1-2 \cdot f_1((n+k_1) \mod N)] \cdot [1-2 \cdot f_2((n+k) \mod N)]$, where n=0, 1, ..., N−1, k=0, 1, 2, ..., N−1, and $k_1$=0, 1, 2, ..., 2(N−1). That is, n is an integer less than or equal to N−1, k is an integer less than or equal to N−1, and $k_1$ is an integer less than or equal to 2(N−1). Another condition that may be satisfied by the first local synchronization signal is provided in this embodiment of this application, thereby increasing an implementation of this embodiment of this application.

An eleventh aspect of an embodiment of this application provides a synchronization signal sending method. The method includes: generating, by a network device, a first synchronization signal sequence and a second synchronization signal sequence, where the second synchronization signal sequence is a sequence obtained based on a first m-sequence and a second m-sequence, a relative shift value between the first m-sequence and the second m-sequence is m, a cyclic shift value is p, a value range of p does not include a cyclic shift value k strongly correlated to the first synchronization signal sequence, and the first m-sequence and the second m-sequence each have a length of N; mapping, by the network device, the first synchronization signal sequence onto M subcarriers in a first time unit to obtain a first synchronization signal, and mapping the second synchronization signal sequence onto M subcarriers in a second time unit to obtain a second synchronization signal, where M and N are positive integers greater than 1; and sending, by the network device, the first synchronization signal and the second synchronization signal. In this embodiment of this application, the network device generates the first synchronization signal sequence and the second synchronization signal sequence that have a small correlation value, namely, a primary synchronization signal sequence and a secondary synchronization signal sequence, to reduce cross-correlation between a secondary synchronization signal and a primary synchronization signal, thereby reducing interference caused to a primary synchronization signal by a secondary synchronization signal in another cell or in a local cell.

In a first implementation of the eleventh aspect in this embodiment of this application, the second synchronization signal sequence may be a Gold sequence, and the Gold sequence is a sequence generated based on a first m-sequence $f_1(n)$ and the second m-sequence $f_2(n)$, and satisfies $y_{m,k}(n)=1-2 \cdot g_{m,k}(n)$, $g_{m,k}(n)=(f_1((n+m+k) \bmod N)+f_2((n+k) \bmod N)) \bmod 2$, $n=0, 1, 2, \ldots, N-1$, $k=0, 1, 2, \ldots, N-1$, $m=0, 1, 2, \ldots, N-1$, where $y_{m,k}(n)$ is the second synchronization signal sequence, $g_{m,k}(n)$ is the Gold sequence, and $f_1(n)$ and $f_2(n)$ are m-sequences. The second synchronization signal sequence is limited in this embodiment of this application, thereby improving implementability and operability of this embodiment of this application.

A twelfth aspect of an embodiment of this application provides a synchronization signal receiving method. The method includes: receiving, by user equipment, a first receive signal and a second receive signal; generating, by the user equipment, local synchronization signal sequences, where the local synchronization signal sequences includes a first local synchronization signal sequence and a second local synchronization signal sequence, the second local synchronization signal sequence is a sequence obtained based on a first m-sequence and a second m-sequence, a relative shift value between the first m-sequence and the second m-sequence is m, a cyclic shift value is p, a value range of p does not include a cyclic shift value k strongly correlated to the first synchronization signal sequence, the first m-sequence and the second m-sequence each have a length of N, and N is a positive integer greater than 1; and processing, by the user equipment, the first receive signal and the second receive signal based on the local synchronization signal sequence. In this embodiment of this application, the user equipment processes the first receive signal and the second receive signal respectively by using the generated first local synchronization signal sequence and second local synchronization signal sequence that have a small correlation value, that is, the user equipment processes the first reception signal and the second reception signal respectively by using a local primary synchronization signal sequence and a local secondary synchronization signal sequence, to reduce a probability of false detection of a local secondary synchronization signal and a local primary synchronization signal, thereby improving performance of detecting the first receive signal and the second receive signal.

In a first implementation of the twelfth aspect in this embodiment of this application, the second local synchronization signal sequence may be a Gold sequence, and the Gold sequence is generated based on a first m-sequence $f_1(n)$ and the second m-sequence $f_2(n)$, and satisfies $y_{m,k}(n)=1-2 \cdot g_{m,k}(n)$, $g_{m,k}(n)=(f_1((n+m+k) \bmod N)+f_2((n+k) \bmod N)) \bmod 2$, $n=0, 1, 2, \ldots, N-1$, $k=0, 1, 2, \ldots, N-1$, $m=0, 1, 2, \ldots, N-1$, where $y_{m,k}(n)$ is the second local synchronization signal sequence, $g_{m,k}(n)$ is the Gold sequence, and $f_1(n)$ and $f_2(n)$ are m-sequences. The second local synchronization signal sequence is limited in this embodiment of this application, thereby improving implementability and operability of this embodiment of this application.

A thirteenth aspect of this application provides a computer-readable storage medium. The computer-readable storage medium stores instructions, which when executed by a computer, causes the computer to perform the following steps: generating a first synchronization signal sequence and a second synchronization signal sequence, where the first synchronization signal sequence is a sequence obtained based on a first m-sequence, the second synchronization signal sequence is a sequence obtained based on a first Gold sequence, the first Gold sequence is generated based on a second m-sequence and a third m-sequence, a generator polynomial of the first m-sequence is the same as a generator polynomial of the second m-sequence, and the first m-sequence, the second m-sequence, and the third m-sequence each have a length of N; and mapping the first synchronization signal sequence onto M subcarriers in a first time unit to obtain a first synchronization signal, and mapping the second synchronization signal sequence onto M subcarriers in a second time unit to obtain a second synchronization signal, where M and N are positive integers greater than 1.

Optionally, the first synchronization signal sequence is a sequence obtained based on the first m-sequence, and the generator polynomial of the first m-sequence {c(n)|n=0, 1, 2, ..., N−1} is $g_1(x)=\Sigma_{i=0}^{K} a_i \cdot x^i$, where $a_K=1$, $a_0=1$, K is a positive integer greater than or equal to 1, and $0 \le i \le K$. The first synchronization signal sequence and the first m-sequence satisfy $s(n)=1-2 \cdot c(n)$, $n=0, 1, 2, \ldots, N-1$, $c((n+K) \bmod N)=(\Sigma_{i=0}^{K-1} a_i \cdot c((n+i) \bmod N)+c(n)) \bmod 2$, $n=0, 1, 2, \ldots, N-K-1$, where s(n) is the first synchronization signal sequence, and c(n) is the first m-sequence.

Optionally, the second synchronization signal sequence is a sequence obtained based on the first Gold sequence, the first Gold sequence is generated based on a second m-sequence $\{f_1(n)|n=0, 1, 2, \ldots, N-1\}$ and a third m-sequence $\{f_2(n)|n=0, 1, 2, \ldots, N-1\}$, the generator polynomial of the second m-sequence is $g_2(x)=\Sigma_{i=0}^{K} b_i \cdot x^i$, and a generator polynomial of the third m-sequence is $g_3(x)=\Sigma_{i=0}^{K} c_i \cdot x^i$, where $b_K=1$, $b_0=1$, $c_K=1$, $c_0=1$, K is a positive integer greater than or equal to 1, and $0 \le i \le K$. The first Gold sequence, the second m-sequence, and the third m-sequence satisfy $y_{m,k}(n)=1-2 \cdot g_{m,k}(n)$, $g_{m,k}(n)=(f_1((n+m+k) \bmod N)+f_2((n+k) \bmod$ N))mod 2, n=0, 1, 2, ..., N−1, k=0, 1, 2, ..., N−1, m=0, 1, 2, ..., N−1, where $y_{m,k}(n)$ is the second synchronization signal sequence, $g_{m,k}(n)$ is the first Gold sequence, m is a relative shift value between the sequence $f_1(n)$ and the sequence $f_2(n)$, and k is a cyclic shift value.

Optionally, the second synchronization signal sequence satisfies $y_{m,k}(n)=x_1((n+m+k)\mod N)\cdot x_2((n+k)\mod N)$, $x_1(n)=1-2\cdot f_1(n)$, $x_2(n)=1-2\cdot f_2(n)$, n=0, 1, ..., N−1, k=0, 1, 2, ..., N−1, m=0, 1, 2, ..., N−1, where $y_{m,k}(n)$ is the second synchronization signal sequence, $f_1(n)$ is the second m-sequence, and $f_2(n)$ is the third m-sequence. It may be understood that $x_1(n)=1-2\cdot f_1(n)$ and $x_2(n)=1-2\cdot f_2(n)$ are substituted into $y_{m,k}(n)=x_1((n+m+k)\mod N) x_2((n+k)\mod N)$, so as to learn that the second synchronization signal sequence $y_{m,k}(n)$ may also be represented as $y_{m,k}(n)=[1-2\cdot f_1((n+m+k)\mod N)]\cdot[1-2\cdot f_2((n+k)\mod N)]$. For simplicity, m+k may be denoted as $k_1$, that is, $k_1=m+k$. In this case, the second synchronization signal sequence $y_{m,k}(n)$ may also be represented as $y_{m,k}(n)=[1-2\cdot f_1((n+k_1)\mod N)]\cdot[1-2\cdot f_2((n+k)\mod N)]$, where n=0, 1, ..., N−1, k=0, 1, 2, ..., N−1, and $k_1$=0, 1, 2, ..., 2(N−1). That is, n is an integer less than or equal to N−1, k is an integer less than or equal to N−1, and $k_1$ is an integer less than or equal to 2(N−1).

Optionally, local synchronization signal sequences is generated. The local synchronization signal sequences includes a first local synchronization signal sequence and a second local synchronization signal sequence. The first local synchronization signal sequence is a sequence obtained based on a first m-sequence, the second local synchronization signal sequence is a sequence obtained based on a first Gold sequence, the first Gold sequence is generated based on a second m-sequence and a third m-sequence, a generator polynomial of the first m-sequence is the same as a generator polynomial of the second m-sequence, and the first m-sequence, the second m-sequence, and the third m-sequence each have a length of N, where N is a positive integer greater than 1. The first receive signal and the second receive signal are processed based on the local synchronization signal sequence.

It can be learned from the foregoing technical solutions that the embodiments of this application have the following advantages:

In the technical solutions provided in the embodiments of this application, the network device generates the first synchronization signal sequence and the second synchronization signal sequence. The first synchronization signal sequence is a sequence obtained based on an m-sequence, the second synchronization signal sequence is a sequence obtained based on a Gold sequence, the Gold sequence is generated based on a first m-sequence and a second m-sequence, and a generator polynomial of the m-sequence is the same as a generator polynomial of the first m-sequence of the Gold sequence. The network device maps the first synchronization signal sequence and the second synchronization signal sequence respectively onto N subcarriers in the first time unit and N subcarriers in the second time unit, to obtain the first synchronization signal and the second synchronization signal, where N is a positive integer greater than or equal to 1. The network device sends the first synchronization signal and the second synchronization signal. In the embodiments of this application, a primary synchronization signal sequence and a secondary synchronization signal sequence that have a small correlation value and that are generated by the network device reduce cross-correlation between a secondary synchronization signal and a primary synchronization signal, thereby reducing interference caused to a primary synchronization signal by a secondary synchronization signal in another cell or in a local cell.

DETAILED DESCRIPTION OF ILLUSTRATIVE EMBODIMENTS

Embodiments of this application provide a synchronization signal sending method, so as to reduce correlation between a secondary synchronization signal and a primary synchronization signal, and reduce interference to the primary synchronization signal.

To make persons skilled in the art understand the technical solutions in this application better, the following describes the embodiments of this application with reference to the accompanying drawings in the embodiments of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Figures 1A, 1B:
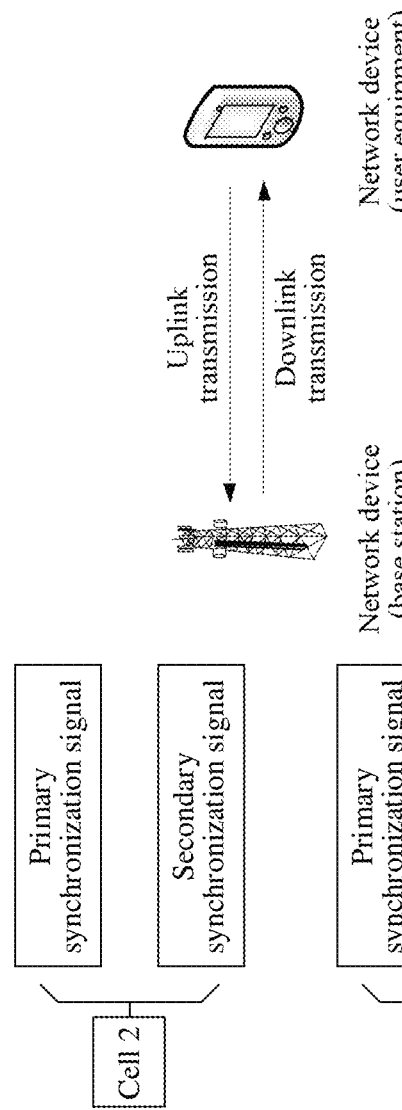
FIG. 1a is a schematic diagram of a network architecture according to an embodiment of this application.
FIG. 1b is a schematic diagram of a scenario according to an embodiment of this application.

The embodiments of this application may be applied to a network architecture shown in FIG. 1a. In the network architecture, a synchronization signal is transmitted between a network device (for example, a base station) and user equipment (for example, a mobile phone). A device transmitting a synchronization signal in this application is referred to as a network device. The embodiments of this application are described by using an example in which a network device sends a synchronization signal to user equipment. As shown in FIG. 1b, when a user terminal in a cell 1 detects a primary synchronization signal, secondary synchronization signals in the cell 1 and a cell 2 cause interference to the primary synchronization signal in the cell 1. Because the cell 2 and the cell 1 may not synchronize in time, the secondary synchronization signal in the cell 2 and the primary synchronization signal in the cell 1 may overlap with each other in terms of time. In this case, the secondary synchronization signal in the cell 2 causes interference to the primary synchronization signal in the cell 1. The secondary synchronization signal in the cell 1 may also cause interference to detection of the primary synchronization signal in the cell 1. This is because when detects the primary synchronization signal in the cell 1, the user terminal performs correlation operation on a received signal by using a local primary synchronization signal sequence. If a received signal is a secondary synchronization signal, the correlation operation on sequence for the received secondary synchronization signal by using local primary synchronization signal sequence is performed. Consequently, detection for the primary synchronization signal is interfered by the secondary synchronization signal.

It may be understood that a synchronization signal may also be sent and received between network devices or between user equipments. This is not specifically limited herein.

The network device in this application may be any device having a wireless transmission and receiving function, and includes, but is not limited to: a base transceiver station (base transceiver station, BTS) in a Global System for Mobile Communications (Global System for Mobile, GSM) or CDMA, a NodeB (NodeB) in WCDMA, an evolved NodeB (NodeB or eNB or e-NodeB, evolved NodeB) in LTE, a gNodeB (gNodeB or gNB) or a transmission/reception point (transmission reception point, TRP) in NR, a base station of future evolution in 3GPP, an access node in a WiFi system, a wireless relay node, a wireless backhaul node, and the like. The base station may be a macro base station, a micro base station, a picocell base station, a small cell, a relay station, or the like. A plurality of base stations can support networks that use a same technology mentioned above, or may support networks that use different technologies mentioned above. The base station may include one or more co-sited or non-co-sited transmission/reception points (Transmission receiving point, TRP). The network device may alternatively be a radio controller, a centralized unit (centralized unit, CU), and/or a distributed unit (distributed unit, DU) in a cloud radio access network (cloud radio access network, CRAN) scenario. The network device may alternatively be a server, a wearable device, an in-vehicle device, or the like. That the network device is a base station is used as an example below for description. The plurality of network devices may be base stations of a same type or base stations of different types. The base station may communicate with a terminal device, or may communicate with a terminal device by using a relay station. The terminal device may communicate with a plurality of base stations that use different technologies. For example, the terminal device may communicate with a base station supporting an LTE network, may communicate with a base station supporting a 5G network, or may support a dual connection to a base station in an LTE network and a base station in a 5G network.

In this application, the terminal device is a device having a wireless transmission and receiving function, and may be deployed on land including an indoor or outdoor environment, in a handheld, wearable, or in-vehicle manner, may be deployed on a water surface (for example, in a ship), or may be deployed in air (for example, on an airplane, in a balloon, or on a satellite). The terminal device may be a mobile phone (mobile phone), a tablet computer (Pad), a computer having a wireless transmission and receiving function, a virtual reality (virtual reality, VR) terminal device, an augmented reality (augmented reality, AR) terminal device, a wireless terminal related to industrial control (industrial control), a wireless terminal related to self-driving (self driving), a wireless terminal related to remote medical (remote medical), a wireless terminal related to a smart grid (smart grid), a wireless terminal related to transportation safety (transportation safety), a wireless terminal related to a smart city (smart city), a wireless terminal related to a smart home (smart home), or the like. The embodiments of this application impose no limitation on an application scenario. The user equipment sometimes may also be referred to as a terminal, a terminal device, user equipment (user equipment, UE), an access terminal device, a UE unit, a UE station, a mobile station, a mobile, a remote station, a remote terminal device, a mobile device, a UE terminal device, a terminal device, a wireless communications device, a UE agent, a UE apparatus, or the like. Further, the terminal may be stationary or movable.

According to a sequence rule, a generator polynomial of an m-sequence is $g(x)=\Sigma_{i=0}^{K} a_i \cdot x^i$, where $a_K=1$, $a_0=1$, and if the generator polynomial is g(x), generated sequence c(n)={c(n)|n=0, 1, 2, . . . , N−1} satisfies the following recursive relationship: $c((n+K) \mod N)=(\Sigma_{i=0}^{K-1} a_i \cdot c((n+i) \mod N)+c(n)) \mod 2$, n=0, 1, 2, . . . , N−K−1. An initial state is c(K−1), c(K−2), c(K−3), . . . , c(1), c(0), and the sequence {c(n)|n=0, 1, 2, . . . , N−1} may be obtained based on the initial status value and a recursion formula. When the generator polynomial is a Kth-order primitive polynomial, the obtained sequence is an m-sequence having a length of $N=2^K-1$.

A Gold sequence is a sequence generated by performing modulo 2 addition on a pair of preferred m-sequences. The pair of preferred m-sequences leads to relatively small cross-correlation between different Gold sequences. $f_1(n)$ and $f_2(n)$ are two m-sequences each having a length of N, $g_{m,k}(n)=(f_1((n+m+k) \mod N)+f_2((n+k) \mod N)) \mod 2$ is a Gold sequence having a length of N, where m=0, 1, 2, . . . , N−1, k=0, 1, 2, . . . , N−1. Variation in m and k leads to generation of a plurality of different Gold sequences in a same group. One pair of m-sequences in the Gold sequences leads to relatively small cross-correlation between the different Gold sequences in the same group.

It is assumed that a generator polynomial of a primary synchronization signal sequence is $g(x)=x_2+x^4+1$, that is, c(n+7)=(c(n+4)+c(n))mod 2, where c(n) is an m-sequence. An initial state is 1 1 1 0 1 1 0, that is, c(6)=1, c(5)=1, c(4)=1, c(3)=0, c(2)=1, c(1)=1, c(0)=0. The m-sequence may also be represented as {c(6), c(5), c(4), c(3), c(2), c(1), c(0)}={1 1 1 0 1 1 0}. Further, after BPSK modulation is performed on the m-sequence, the m-sequence is mapped onto N subcarriers. For example, N=127. A modulated primary synchronization signal sequence is $s(n)=1-2\cdot c(n)$, $n=0, 1, \ldots, N-1$. It can be learned that herein, the m-sequence $c(n)$ and the primary synchronization signal sequence $s(n)$ each have a length of N. For example, three primary synchronization signal sequences may be generated based on cyclically shifted sequences of $c(n)$ with three cyclic shifts (0, 43, 86). A cyclically shifted sequence of the sequence $\{c(n)|n=0, 1, 2, \ldots, N-1\}$ is represented as $\{c((n+p) \bmod N)|n=0, 1, 2, \ldots, N-1\}$, where p is a cyclic shift value, and $p=0, 1, 2, \ldots, N-1$. For example, if a cyclic shift value p is 0 and $N=127$, the primary synchronization signal sequence is represented as $s(n)=1-2\cdot c((n) \bmod 127)$. If a cyclic shift value p is 43 and $N=127$, the primary synchronization signal sequence is represented as $s(n)=1-2\cdot c((n+43) \bmod 127)$. If a cyclic shift value p is 86, and $N=127$, the primary synchronization signal sequence is represented as $s(n)=1-2\cdot c((n+86) \bmod 127)$.

A secondary synchronization signal sequence is obtained based on a sequence $g_{m,k}(n)$ which is generated based on two m-sequences, for example, may be obtained based on sequences $f_1(n)$ and $f_2(n)$ that are generated respectively by using generator polynomials $g_1(x)=x_7+x^3+1$ and $g_2(x)=x^3+x^2+x+1$, where $g_{m,k}(n)=(f_1((n+m+k) \bmod N)+f_2((n+k) \bmod N)) \bmod 2$, and an initial value is 1 1 1 0 1 1 0. Herein, m is a relative shift value between the two m-sequences. For example, $m=0, 1, 2, \ldots, 126$, $n=0, 1, 2, \ldots, 126$. Further, after BPSK modulation is performed on the Gold sequence, the Gold sequence is mapped onto N subcarriers, where $N=127$.

$y_{m,k}(n)=1-2\cdot g_{m,k}(n)$, $n=0, 1, \ldots, N-1$ is a secondary synchronization signal sequence and is mapped onto N subcarriers. Herein, the primary synchronization signal and the secondary synchronization signal are located on different OFDM symbols. For example, $N=127$.

When a secondary synchronization signal in a neighboring cell is overlapped with a primary synchronization signal in a local cell in time domain, interference is caused to the primary synchronization signal. When the UE detects the primary synchronization signal of the local cell, the secondary synchronization signal and the primary synchronization signal have a relatively large correlation value. This also causes interference to detection of the primary synchronization signal. Specifically, for the foregoing generated Gold sequence of the secondary synchronization signal, maximum correlation values between a sequence for a primary synchronization signal having a cyclic shift of 0 and a sequence whose cyclic shift value is $k_m$ corresponding to 127 relative shift values ($m=0, 1, \ldots, 126$) of the Gold sequence are as follows: {33, 29, 25, 31, 41, 29, 33, 33, 29, 25, 31, 41, 29, 33, 33, 29, 25, 31, 41, 29, 33, 33, 29, 25, 31, 41, 29, 33, 33, 29, 25, 31, 41, 29, 33, 33, 29, 25, 31, 41, 29, 33, 33, 29, 25, 31, 41, 29, 33, 33, 29, 25, 31, 41, 29, 33, 33, 29, 25, 31, 41, 29, 33, 33, 29, 25, 31, 41, 29, 33, 33, 29, 25, 31, 41, 29, 33, 33, 29, 25, 31, 41, 29, 33, 33, 29, 25, 31, 41, 29, 33, 33, 29, 25, 31, 41, 29, 33, 33, 29, 25, 31, 41, 29, 33, 33, 29, 25, 31, 41, 29, 33, 33, 29, 25, 31, 41, 29, 33, 33, 29, 25, 31, 41, 29, 33, 33}.

Values of $k_m$ are as one of the following: {20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20}.

Usually, a maximum correlation value between different sequences in a group of Gold sequences is 17. Apparently, the foregoing correlation values are much greater than 17, leading to relatively large interference caused to the primary synchronization signal by the secondary synchronization signal.

Figure 2:
FIG. 2 is a schematic diagram of a synchronization signal sending method according to an embodiment of this application.

For convenience of understanding, specific procedures of the embodiments of this application are described below. Referring to FIG. 2, an embodiment of a synchronization signal sending method according to the embodiments of this application includes the following steps.

201. A network device generates a first synchronization signal sequence and a second synchronization signal sequence.

The network device generates the first synchronization signal sequence and the second synchronization signal sequence. The first synchronization signal sequence is a sequence obtained based on a first m-sequence, the second synchronization signal sequence is a sequence obtained based on a first Gold sequence, the first Gold sequence is generated based on a second m-sequence and a third m-sequence, a generator polynomial of the first m-sequence is the same as a generator polynomial of the second m-sequence, and the first m-sequence, the second m-sequence, and the third m-sequence each have a length of N, where N is a positive integer greater than 1.

It should be noted that the first synchronization signal sequence is the sequence obtained based on the first m-sequence. The network device obtains an m-sequence $\{c(n)|n=0, 1, 2, \ldots, N-1\}$ based on a generator polynomial $g_1(x)=\sum_{i=0}^{K} a_i \cdot x^i$, where a value of a coefficient of the polynomial may be 0 or 1, and $a_K=1$, $a_0=1$, K is a positive integer greater than 1, and $0 \leq i \leq K$. Then, the network device obtains the first synchronization signal sequence $s(n)=1-2\cdot c(n)$, $n=0, 1, 2, \ldots, N-1$, $c((n+K) \bmod N)=(\sum_{i=0}^{K-1} a_i \cdot c((n+i) \bmod N)+c(n)) \bmod 2$, $n=0, 1, 2, \ldots, N-K-1$ based on an initial state value of the first m-sequence and a recursion formula, where $s(n)$ is the first synchronization signal sequence, and $c(n)$ is the first m-sequence. A different initial state value of the first m-sequence leads to a different obtained sequence. The initial state value of the first m-sequence is not limited herein. The second synchronization signal sequence is the sequence obtained based on the first Gold sequence, the first Gold sequence is generated based on a second m-sequence $\{f_1(n)|n=0, 1, 2, \ldots, N-1\}$ and a third m-sequence $\{f_2(n)|n=0, 1, 2, \ldots, N-1\}$, the generator polynomial of the second n-sequence is $g_2(x)=\sum_{i=0}^{K} b_i \cdot x^i$, and a generator polynomial of the third m-sequence is $g_3(x)=\sum_{i=0}^{K} c_i \cdot x^i$, where $b_K=1$, $b_0=1$, $c_K=1$, $c_0=1$, K is a positive integer greater than 1, and $0 \leq i \leq K$. The first Gold sequence, the second m-sequence, and the third m-sequence satisfy $y_{m,k}(n) 1-2\cdot g_{m,k}(n)$, $g_{m,k}(n)=(f_1((n+m+k) \bmod N)+f_2((n+k) \bmod N)) \bmod 2$, $n=0, 1, 2, \ldots, N-1$, $k=0, 1, 2, \ldots, N-1$, $m=0, 1, 2, \ldots, N-1$, where $g_{m,k}(n)$ is the first Gold sequence, n is a relative shift value between the sequence $f_1(n)$ and the sequence $f_2(n)$, and k is a cyclic shift value.

It may be understood that when the generator polynomial is a Kth-order primitive polynomial, the obtained first synchronization signal sequence is an m-sequence. The first synchronization signal sequence has a length of N, where $N=2^K-1$. For example, when $K=7$, $N=127$. K is an integer greater than 1. This is not specifically limited herein. Cyclic shift may be performed on the first synchronization signal sequence and the second synchronization signal sequence, to obtain other sequences having same properties. For example, a sequence obtained after cyclic shift is performed on the first synchronization signal sequence has a property the same as that of the first synchronization signal sequence, and is still an m signal sequence. After cyclic shift is performed on the second synchronization signal sequence, another Gold sequence in a same group is obtained. A cyclically shifted sequence satisfies {c((n+p)mod N)|n=0, 1, 2, . . . , N−1}, where p is a cyclic shift value, including, but not limited to p=0, 1, 2, . . . , N−1.

For example, when K=7, N is 127. A first synchronization signal sequence corresponding to a first synchronization signal is a sequence obtained based on the first m-sequence. The generator polynomial of the first m-sequence is $g(x)=x+x^4+1$. The recursion formula is $c(n+7)=(c(n+4)+c(n))$ mod 2. The initial state value of the first m-sequence is {1 1 1 0 1 1 0}. That is, c(6)=1, c(5)=1, c(4)=1, c(3)=0, c(2)=1, c(1)=1, c(0)=0. In other words, {c(6), c(5), c(4), c(3), c(2), c(1), c(0)}={1 1 1 0 1 1 0}. Based on the initial value of the first m-sequence, a sequence that is of the first synchronization signal and that has a length of 127 is obtained: {1 1 1 1 1 0 0 0 0 1 1 1 1 1 1 0 0 0 1 0 1 1 0 0 1 0 0 1 0 0 0 0 1 1 0 0 0 0 1 1 1 0 1 0 1 1 0 1 1 0 0 0 0 0 1 1 0 0 1 1 0 1 0 1 0 0 1 1 1 0 0 1 1 1 0 0 1 1 1 1 0 1 1 0 1 0 0 0 0 1 0 1 0 1 0 1 1 1 1 1 0 1 0 0 1 0 1 0 0 1 1 1 0 0 1 1 1 1 0 1 1 0}.

Figures 3, 4:
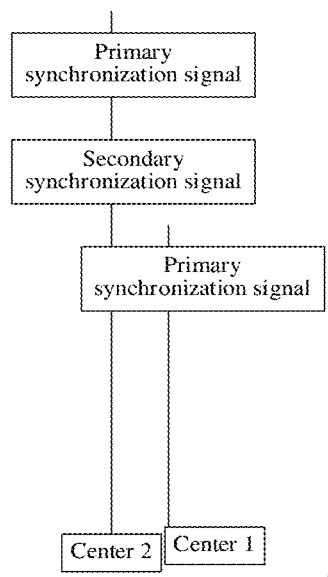
FIG. 3 is a schematic diagram of a correspondence between an octal value and a primitive polynomial according to an embodiment of this application.
FIG. 4 is a schematic diagram of a scenario in which a synchronization signal has different center frequencies according to an embodiment of this application.

As shown in FIG. 3, a second synchronization signal sequence corresponding to a second synchronization signal is a sequence obtained based on the second m-sequence and the third m-sequence. The generator polynomial of the second m-sequence is the same as the generator polynomial of the first m-sequence of the first synchronization signal. For example, the generator polynomial of the second m-sequence may be represented as $g(x)=x+x^4+1$. A primitive polynomial corresponding to the second m-sequence is {1 0 0 1 0 0 0 1}, and corresponds to an octal value 221. For example, the generator polynomial of the third m-sequence may be a generator polynomial corresponding to any one of octal values 361, 375, 313, 301, 325, 345, 367, 271, 253, and 203 in FIG. 3, and a coefficient $a_7, a_6, \ldots, a_1, a_0$ is a value corresponding to each primitive polynomial (in other words, the foregoing generator polynomial) in FIG. 3, where $a_7$ is a highest bit. For example, a value 361 is represented as 1 1 1 1 0 0 0 1 in a binary form, and a generator polynomial corresponding to the value is $g_2(x)=x+x^6+x^5+x^4+1$. For another example, an octal value 203 is represented as 1 0 0 0 0 0 1 1 in a binary form, a corresponding generator polynomial is $g_2(x)=x^7+x+1$, and a corresponding recursion formula satisfies $c_1(i+7)=(c_1(i+1)+c_1(i))$mod 2.

Optionally, both the first synchronization signal sequence and the second synchronization signal sequence are sequences obtained based on a Gold sequence. For example, the first synchronization signal sequence is a sequence obtained based on a first Gold sequence, and the first Gold sequence is a sequence generated based on a first m-sequence and a second m-sequence. The second synchronization signal sequence is a sequence obtained based on a second Gold sequence, and the second Gold sequence is a sequence generated based on a third m-sequence and a fourth m-sequence. Generator polynomials of the first m-sequence and the third m-sequence are the same, and generator polynomials of the second m-sequence and the fourth m-sequence are the same. For example, a relative shift value between the first m-sequence and the second m-sequence is $m_1$, a relative shift value between the third m-sequence and the fourth m-sequence is $m_2$, and $m_1 \neq m_2$(mod N) is satisfied. The first m-sequence, the second m-sequence, the third m-sequence, and the fourth m-sequence each have a length of N, where N=2K−1.

In an implementation, the first synchronization signal sequence $y_{m,k}(n)$ satisfies $y_{m,k}(n)=1-2\cdot g_{m,k}(n)$. The sequence $g_{m,k}(n)$ may be a Gold sequence obtained based on the first m-sequence $f_1(n)$ and the second m-sequence $f_2(n)$, and $g_{m,k}(n)=(f((n+m+k)\mod N)+f_2((n+k)\mod N))\mod 2$, n=0, 1, 2, . . . , N−1, k=0, 1, 2, . . . , N−1, m=0, 1, 2, . . . , N−1, where m is the relative shift value between the sequence $f_1(n)$ and the sequence $f_2(n)$. The second synchronization signal sequence $y_{m,k}(n)$ satisfies $y_{m,k}(n)=1-2\cdot g_{m,k}(n)$. $g_{m,k}(n)$ may be a Gold sequence obtained based on the third m-sequence $f_3(n)$ and the fourth m-sequence $f_4(n)$, and $g_{m,k}(n)=(f_3((n+m+k)\mod N)+f_4((n+k)\mod N))\mod 2$. The relative shift value between the third m-sequence $f_3(n)$ and the fourth m-sequence $f_4(n)$ is $m_2$, n=0, 1, 2, . . . , N−1, k=0, 1, 2, . . . , N−1, m=0, 1, 2, . . . , N−1, and k is the cyclic shift value.

The generator polynomials of the first m-sequence and the third m-sequence are the same and both are $g_1(x)$, where $g_1(x)=\Sigma_{i=}^{K} a_i \cdot x^i$, $a_K=1$, $a_0=1$. The generator polynomials of the second m-sequence and the fourth m-sequence are the same and both are $g_2(x)$, where $g_2(x)=\Sigma_{i=0}^{K} b_i \cdot x^i$, $b_K=1$, $b_0=1$, and $m_1 \neq m_2$(mod N) is satisfied.

202. The network device obtains a first synchronization signal and a second synchronization signal.

The network device maps the first synchronization signal sequence onto M subcarriers in a first time unit to obtain the first synchronization signal, and maps the second synchronization signal sequence onto M subcarriers in a second time unit to obtain the second synchronization signal, where M is a positive integer greater than 1.

It should be noted that the first synchronization signal and the second synchronization signal that are obtained by the network device may be sequences obtained after modulation and transformation are performed on m-sequences, or may be generated according to a formula. The first synchronization signal satisfies $s(n)=1-2\cdot c(n)$, n=0, 1, . . . , N−1, where N is a positive integer greater than 1, s(n) is the first synchronization signal sequence, and c(n) is the first m-sequence.

M=N or M=N−1. When M=N, N elements in a synchronization signal sequence are mapped onto N subcarriers. When M=N−1, elements other than a central element in a synchronization signal sequence are mapped onto N−1 subcarriers. A central element in a sequence of a synchronization signal may be mapped onto a central subcarrier of the synchronization signal in a frequency domain or may not be transmitted. This is not limited in the embodiments of the present invention.

It may be understood that the network device may modulate an m-sequence through binary phase shift keying (binary phase shift keying, BPSK), to obtain a modulated and transformed synchronization signal sequence. The network device may alternatively, including, but not limited to, modulate the synchronization signal sequence by using another modulation scheme.

For example, when the first m-sequence is the sequence {1 1 1 1 1 1 0 0 0 0 1 1 1 0 1 1 1 1 0 0 1 0 1 1 0 0 1 0 0 1 0 0 0 1 0 0 1 1 0 0 0 1 0 1 1 1 0 1 0 1 1 0 1 1 0 0 0 0 0 1 1 0 0 1 1 0 1 0 1 0 0 1 1 1 0 0 1 1 1 0 0 1 1 1 0 1 1 0 1 0 0 0 0 1 0 1 0 1 0 1 1 1 1 1 0 1 0 0 1 0 1 0 0 1 1 1 0 0 1 1 1 1 0 1 1} in the foregoing step, a modulated and transformed sequence is {−1−1−1−1−1−1 1 1 1 1−1−1−1 1−1−1−1−1 1 1−1 1−1−1 1 1−1 1−1 1 1−1 1 1 1 1−1−1 1 1−1−1 1 1 1−1−1 1 1−1−1 1 1−1 1 1−1−1 1 1−1−1 1 1−1 1 1 1 1 1−1−1 1−1−1 1 1 1 1 1−1 1−1 1−1−1 1 1 1 1 1 1 1 1 1−1 1 1 1 1−1 1−1−1−1 1 1 1−1 1−1 1−1 1 1−1−1 1 1−1 1−1 1 1 1 1−1 1 1 1−1−1−1 1−1−1 1 1 1 1 1 1 1 1 1 1 1 1 1 1 1 1−1−1 1 1 1 1−1−1 1 1−1 1 1 1 1 1 1 1 1 1 1 1 1 1−1−1−1−1 1−1−1 1 1}. A modulation process of the first Gold sequence is similar to a modulation process of the first m-sequence, and details are not described herein again.

203. The network device sends the first synchronization signal and the second synchronization signal.

The network device sends the first synchronization signal on a subcarrier carrying the first synchronization signal sequence, and sends the second synchronization signal on a subcarrier carrying the second synchronization signal sequence.

204. User equipment receives a first receive signal and a second receive signal.

The user equipment receives a signal sent by the network device, and chooses to receive the first receive signal and the second receive signal that satisfy a signal quality requirement.

It should be noted that the user equipment may receive a sensed signal, and receive the needed first receive signal and second receive signal from a signal whose signal quality satisfies a requirement. The signal quality may include, but not limited to a signal strength, channel quality indication information, and the like.

205. The user equipment generates local synchronization signal sequences.

The user equipment generates local synchronization signal sequences. The local synchronization signal sequence includes a first local synchronization signal sequence and a second local synchronization signal sequence. The first local synchronization signal sequence is a sequence obtained based on the first m-sequence, the second local synchronization signal sequence is a sequence obtained based on the first Gold sequence, the first Gold sequence is generated based on a second m-sequence and a third m-sequence, and the generator polynomial of the first m-sequence is the same as the generator polynomial of the second m-sequence in the first Gold sequence.

It should be noted that the first local synchronization signal sequence is the sequence obtained based on the first m-sequence. The user equipment obtains the first m-sequence $\{c(n)|n=0, 1, 2, \ldots, N-1\}$ based on the generator polynomial $g_1(x)=\Sigma_{i=0}^{K} a_i \cdot x^i$, where a value of a coefficient of the polynomial may be 0 or 1, $a_K=1$, $a_0=1$, K is a positive integer greater than or equal to 1, and $0 \leq i \leq K$. Then, the user equipment obtains the first local synchronization signal sequence $s(n)=1-2 \cdot c(n)$, $n=0, 1, 2, \ldots, N-1$, $c((n+K) \bmod N)=(\Sigma_{i=0}^{K-1} a_i \cdot c((n+i) \bmod N)+c(n)) \bmod 2$, $n=0, 1, 2, \ldots, N-K-1$ based on the initial state value of the first m-sequence and the recursion formula, where $s(n)$ is the first local synchronization signal sequence, and $c(n)$ is the first m-sequence. A different initial state value of the first m-sequence leads to a different obtained sequence. The initial state value of the first m-sequence is not limited herein. The second local synchronization signal sequence is the sequence obtained based on the first Gold sequence, the Gold sequence is generated based on a second m-sequence $\{f_1(n)|n=0, 1, 2, \ldots, N-1\}$ and a third m-sequence $\{f_2(n)|n=0, 1, 2, \ldots, N-1\}$. The generator polynomial of the second m-sequence is $g_2(x)=\Sigma_{i=0}^{K} b_i \cdot x^i$, and the generator polynomial of the third m-sequence is $g_3(x)=\Sigma_{i=0}^{K} c_i \cdot x^i$, where $b_K=1$, $b_0=1$, $c_K=1$, $c_0=1$, K is a positive integer greater than or equal to 1, and $0 \leq i \leq K$. The first Gold sequence, the second m-sequence, and the third m-sequence satisfy $y_{m,k}(n)=1-2 \cdot g_{m,k}(n)$, $g_{m,k}(n)=(f_1((n+m+k) \bmod N)+f_2((n+k) \bmod N)) \bmod 2$, $n=0, 1, 2, \ldots, N-1$, $k=0, 1, 2, \ldots, N-1$, $m=0, 1, 2, \ldots, N-1$, where $y_{m,k}(n)$ is the second synchronization signal sequence, $g_{m,k}(n)$ is the first Gold sequence, and m is the relative shift value between the sequence $f_1(n)$ and the sequence $f_2(n)$.

It may be understood that when the generator polynomial is a Kth-order primitive polynomial, the obtained first local synchronization signal sequence is an m-sequence, and the first local synchronization signal sequence has a length of N, where $N=2^K-1$. For example, when K=7, N=127. K is an integer greater than 1. This is not specifically limited herein. Cyclic shift may be performed on the first local synchronization signal sequence and the second local synchronization signal sequence, to obtain other sequences having same properties. For example, a sequence obtained after cyclic shift is performed on the first local synchronization signal sequence has a property same as that of the first local synchronization signal sequence, and is still an m-sequence. A sequence obtained after cyclic shift is performed on the second local synchronization signal sequence is still a Gold sequence. A cyclically shifted sequence of the sequence $\{c(n)|n=0, 1, 2, \ldots, N-1\}$ satisfies $\{c((n+p) \bmod N)|n=0, 1, 2, \ldots, N-1\}$, $p=0, 1, 2, \ldots, N-1$, where p is the cyclic shift value. Alternatively, a cyclically shifted sequence of the sequence $\{c(n)|n=0, 1, 2, \ldots, N-1\}$ satisfies $\{c((n-p) \bmod N)|n=0, 1, 2, \ldots, N-1\}$, where p is the cyclic shift value, including, but not limited to $p=0, 1, 2, \ldots, N-1$.

In an implementation, the user equipment generates the local synchronization signal sequence. The local synchronization signal sequence includes the first local synchronization signal sequence and the second local synchronization signal sequence, the first local synchronization signal sequence is a sequence obtained based on the first Gold sequence, and the first Gold sequence is the sequence generated based on the first m-sequence $f_1(n)$ and the second m-sequence $f_2(n)$. The second local synchronization signal sequence is a sequence obtained based on the second Gold sequence, the second Gold sequence is the sequence generated based on a third m-sequence $f_3(n)$ and a fourth m-sequence $f_4(n)$. The first Gold sequence, the first m-sequence, and the second m-sequence satisfy $y_{m,k}(n)=1-2 \cdot g_{m,k}(n)$, $g_{m,k}(n)=(f_1((n+m+k) \bmod N)+f_2((n+k) \bmod N)) \bmod 2$, where $y_{m,k}(n)$ is the first synchronization signal sequence, $g_{m,k}(n)$ is the first Gold sequence, and the relative shift value between the first m-sequence and the second m-sequence is $m_1$. The second Gold sequence, the third m-sequence, and the fourth m-sequence satisfy $y_{m,k}(n)=1-2 \cdot g_{m,k}(n)$, $g_{m,k}(n)=(f_3((n+m+k) \bmod N)+f_4((n+k) \bmod N)) \bmod 2$, where $y_{m,k}(n)$ is the second synchronization signal sequence, $g_{m,k}(n)$ is the second Gold sequence, the relative shift value between the third m-sequence and the fourth m-sequence is $m_2$, $n=0, 1, 2, \ldots, N-1$, $k=0, 1, 2, \ldots, N-1$, $m=0, 1, 2, \ldots, N-1$, and k is the cyclic shift value. The generator polynomials of the first m-sequence and the third m-sequence are the same and are $g_1(x)=\Sigma_{i=0}^{K} a_i \cdot x^i$, $a_K=1$, $a_0=1$, the generator polynomials of the second m-sequence and the fourth m-sequence are the same and are $g_2(x)=\Sigma_{i=0}^{K} b_i \cdot x^i$, $b_K=1$, $b_0=1$, and $m_1 \neq m_2 (\bmod N)$ is satisfied. In all embodiments of the present invention, in a case of $m_1 \neq m_2 (\bmod N)$, when a system includes a plurality of secondary synchronization signal sequences, a relative shift value of each secondary synchronization signal sequence satisfies $m_1 \neq m_2 (\bmod N)$.

206. The user equipment processes the first receive signal and the second receive signal.

The user equipment processes the first receive signal and the second receive signal based on the local synchronization signal sequence. A local synchronization signal includes a first local synchronization signal and a second local synchronization signal.

It should be noted that a receive signal includes the first receive signal and the second receive signal, and the user equipment performs a correlation operation on the receive signal. The first receive signal and the second receive signal may be the same, for example, may be signals received in one period of time, or may be different, for example, may be signals received in different periods of time.

In this embodiment of this application, the first synchronization signal sequence and the second synchronization signal sequence that have a small correlation value and that are generated by the network device, namely, a primary synchronization signal sequence and a secondary synchronization signal sequence, reduce cross-correlation between a secondary synchronization signal and a primary synchronization signal. When the user equipment detects a primary synchronization signal in a local cell, interference caused to the primary synchronization signal by a secondary synchronization signal in another cell or in the local cell can be reduced, thereby ensuring that when searching the primary synchronization signal at different center frequencies, the primary synchronization signal is not strongly correlated to another synchronization signal due to the different frequencies.

It should be noted that mathematical symbols and letters in the embodiments of the present invention impose no limitation on the embodiments of the present invention. For example, in this embodiment of the present invention, the first m-sequence is represented by $f_1(n)$, or may be represented by using another function symbol or a sequence symbol, such as $a(n)$, $a_1(n)$, or $x(n)$. In a specific implementation process, the foregoing sequence may be data that is stored in a particular order or satisfies a particular relationship and on which mathematical computation or processing is performed.

As shown in FIG. 4, when primary synchronization detection is performed, it is assumed that a frequency center is a center 1, and a center location of an actually sent synchronization signal is a center 2. If a relative shift value of a Gold sequence used by a primary synchronization signal and a relative shift value of a Gold sequence used by a secondary synchronization signal satisfy $m_1 = m_2 \pmod{N}$, different shift values k are used for distinguishing. During detection, when an assumed center is different from a center for actually transmitting the secondary synchronization signal, parts overlapped in a frequency domain may be completely the same, leading to a relatively large correlation value. According to this solution in the embodiments of the present invention, $m_1 \neq m_2 \pmod{N}$. Therefore, a correlation value is relatively small, and interference is relatively small.

It may be understood that processes of processing different receive signals by the user equipment are different. For example, detection of the primary synchronization signal is different from detection of the secondary synchronization signal. During the detection of the primary synchronization signal, a receive-side device needs to assume a center frequency of the primary synchronization signal, and obtain a received signal based on the assumed center frequency of the primary synchronization signal, so as to perform a correlation operation on a generated local primary synchronization signal sequence and the received signal. The detection of the secondary synchronization signal is performed when the primary synchronization signal has been detected. The receive-side device may obtain a center of the secondary synchronization signal based on the center of the detected primary synchronization signal (the center of the primary synchronization signal is usually the same as the center of the secondary synchronization signal). A possible frequency of the center of the primary synchronization signal is $f_0 + n \times f_R$, where n is an integer, $f_0$ is an initial frequency, and $f_R$ is a channel spacing and may be predefined. For example, the channel spacing $f_R$ may be 100 KHz, 180 KHz, 300 KHz, or the like. In addition, a value of $f_R$ may vary with a frequency band (Frequency Band). For example, in a case of a high frequency, a frequency below 3 GHz, a frequency from 3 GHz to 6 GHz, and a frequency from 6 GHz to 52.6 GHz may correspond to different channel spacing values.

There may be a plurality of, for example, three, primary synchronization signal sequences. The network device determines to use one of the primary synchronization signal sequences based on a cell identifier. In an implementation, it is assumed that there are three primary synchronization signal sequences, where two of the primary synchronization signal sequences may be obtained based on two m-sequences, and the other primary synchronization signal sequence may be obtained based on a Gold sequence. Generator polynomials of the two m-sequences are the same as generator polynomials of two m-sequences for a Gold sequence for generating the secondary synchronization signal. Generator polynomials of two m-sequences for a Gold sequence for the primary synchronization signal are the same as polynomials of the two m-sequences for the Gold sequence for generating the secondary synchronization signal. That is, the m-sequences belong to a same group of Gold sequences. There may also be a plurality of secondary synchronization signals. Different Gold sequences are generated through variation of the relative shift value and a cyclic shift value, and the different Gold sequences may carry cell identification information.

The primary synchronization signal sequence has a length of N, three cyclic shift values of an m-sequence for generating the primary synchronization signal sequence are $\{0, a_0, a_1\}$, where $N > a_1 > a_0 > 0$. It is assumed that $b_0 = a_0$, $b_1 = a_1 - a_0$, and $b_2 = N - a_1$. The primary synchronization signal has a subcarrier spacing of $\Delta f$, $a_0$, $a_1$, $f_R$ are selected, so that all values of i=0, 1, 2 satisfy $(b_i \times \Delta f) \bmod f_R > \Delta f$ and $f_R - (b_i \times \Delta f) \bmod f_R > \Delta f$. For different frequency bands, $\Delta f$ may be different. However, each frequency band may be unique. That is, each frequency band has only one value. Sequences of synchronization signals in different frequency bands may have a same length.

For example, it is assumed that N=127, $\Delta f$=15 KHz, $a_0$=43, $a_1$=86, and $f_R$=100 KHz. In this case, $b_0$=43, $b_1$=43, $b_2$=41. Therefore, $b_2 \times \Delta f \bmod f_R$=15 KHz does not satisfy $(b_2 \times \Delta f) \bmod f_R > \Delta f$. In this way, if a deviation between a frequency of the receive-side device and a frequency of a transmit-side device is larger than one subcarrier, when the receive-side device assumes the center frequency of the primary synchronization signal, and searches the primary synchronization signal based on the assumed center frequency, due to a frequency offset caused by the center frequency, the assumed synchronization signal and the primary synchronization signal having a cyclic shift of $b_0$ may have approximately 127−$b_0$=127−42=85 subcarriers overlapped. Even if the center frequency is incorrect, there is a relatively large correlation value, leading to degraded receiving performance of the receive-side device. If $a_0$=42, $a_1$=84, and $f_R$=100 KHz are selected, $b_0$=42, $b_1$=42, and $b_2$=43. $(b_i \times \Delta f) \bmod f_R$=30 KHz, 30 KHz, 45 KHz respectively correspond to i=0, 1, 2.

$f_R - (b_i \times \Delta f) \bmod f_R$=70 KHz, 70 KHz, 25 KHz respectively correspond to i=0, 1, 2. A characteristic of being greater than $\Delta f$ is satisfied.

For another example, if $f_R$=180 KHz, $a_0$=43, $a_1$=86, and $\Delta f$=30 KHz, $b_0$=43, $b_1$=43, and $b_2$=41.

$(b_i \times \Delta f) \bmod f_R$=30 KHz, 30 KHz, 150 KHz respectively correspond to i=0, 1, 2.

$f_R-(b_i\times\Delta f)\bmod f_R=150$ KHz, 150 KHz, 30 KHz respectively correspond to i=0, 1, 2. A characteristic of being greater than $\Delta f$ is not satisfied.

If $f_R=300$ KHz, $a_0=42$, and $a_1=84$, $b_0=42$, $b_1=42$, $b_2=43$, and $\Delta f=30$ KHz.

$(b_i\times\Delta f)\bmod f_R=60$ KHz, 60 KHz, 90 KHz respectively correspond to i=0, 1, 2.

$f_R-(b_i\times\Delta f)\bmod f_R=240$ KHz, 240 KHz, 210 KHz respectively correspond to i=0, 1, 2. A characteristic of being greater than $\Delta f$ is satisfied.

Further, for each frequency band, all of the selected $a_0$, $a_1$, and $f_R$ need to satisfy $(b_i\times\Delta f)\bmod f_R>\Delta f$ and $f_R-(b_i\times\Delta f)\bmod f_R>\Delta f$, where $\Delta f$ is a subcarrier spacing of a primary synchronization signal in the frequency band. During detection of the primary synchronization signal, a method or a device for sending or receiving a primary synchronization signal sequence that satisfies the feature and that is generated based on m-sequences whose cyclic shift values are 0, $a_0$, and $a_1$ can reduce interference caused by detection of a center frequency of a synchronization channel.

Figure 5:
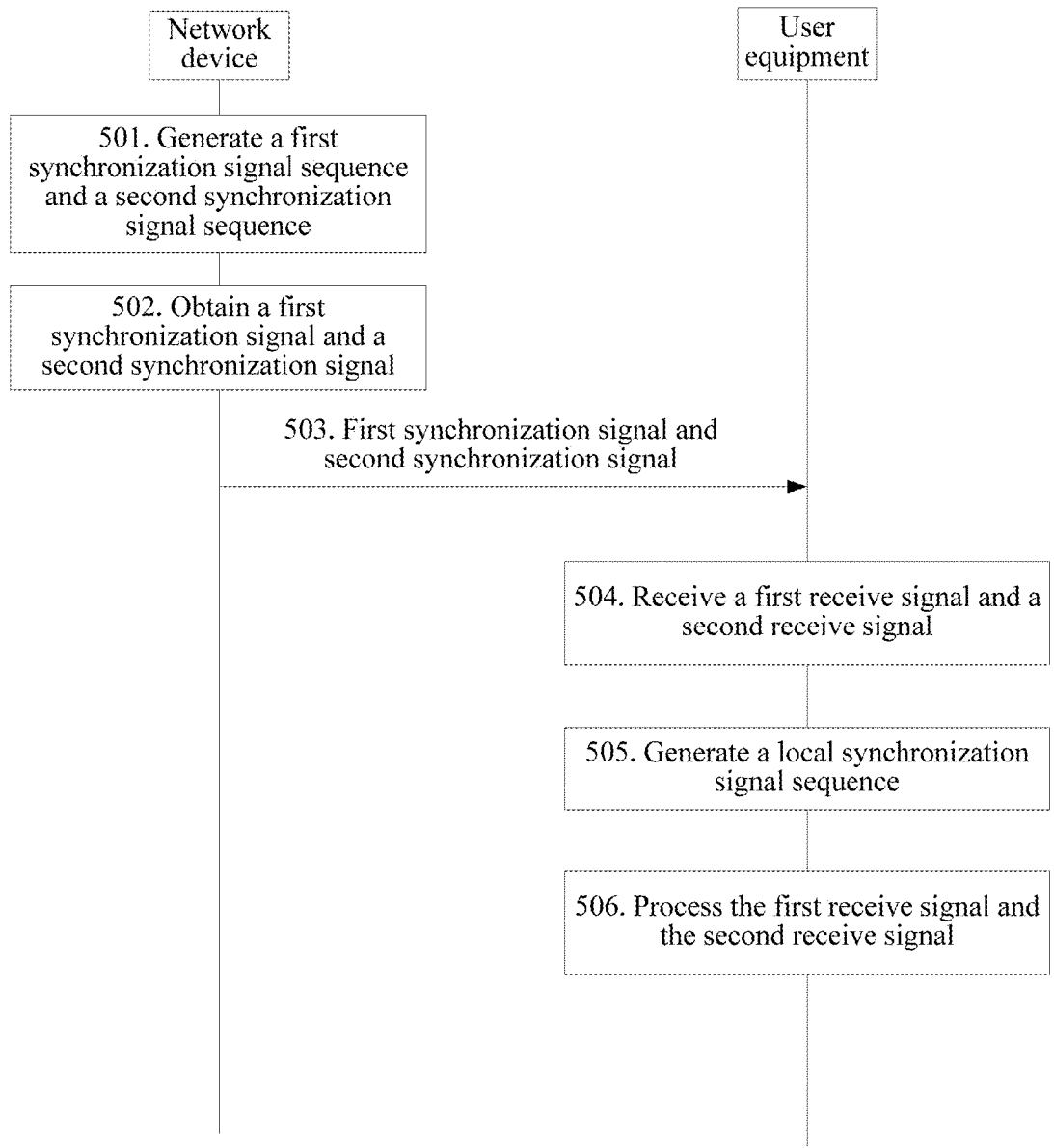
FIG. 5 is a schematic diagram of a synchronization signal sending method according to another embodiment of this application.

With reference to FIG. 5, another embodiment of a synchronization signal sending method provided in the embodiments of this application is described.

501. A network device generates a first synchronization signal sequence and a second synchronization signal sequence.

The network device generates the first synchronization signal sequence and the second synchronization signal sequence. The second synchronization signal sequence is a sequence obtained based on a first m-sequence and a second m-sequence. A relative shift value between the first m-sequence and the second m-sequence of the second synchronization signal sequence is obtained and is m, a cyclic shift value is p, and a value range of p does not include a cyclic shift value k strongly correlated to the first synchronization signal sequence. The first m-sequence and the second m-sequence each have a length of N.

It should be noted that the second synchronization signal sequence is a sequence obtained by performing a modulo 2 addition operation on the first m-sequence and the second m-sequence. That is, the second synchronization signal sequence is generated based on a first m-sequence $\{f_1(n)|n=0, 1, 2, \ldots, N-1\}$ and a second m-sequence $\{f_2(n)|n=0, 1, 2, \ldots, N-1\}$ through the modulo 2 addition operation. A generator polynomial of the first m-sequence is $g_1(x)=\Sigma_{i=0}^{K}a_i\cdot x^i$, and a generator polynomial of the second m-sequence is $g_2(x)=\Sigma_{i=0}^{K}b_i\cdot x^i$, where $a_K=1$, $a_0=1$, $b_K=1$, $b_0=1$, K is a positive integer greater than or equal to 1, and $0\le i\le K$. The second synchronization signal sequence may be obtained based on a Gold sequence, or may not be obtained based on a Gold sequence. The second synchronization signal sequence, the first m-sequence, and the second m-sequence satisfy $y_{m,k}(n)=1-2\cdot g_{m,k}(n)$, $g_{m,k}(n)=(f_1((n+m+k)\bmod N)+f_2((n+k)\bmod N))\bmod 2$, $n=0, 1, 2, \ldots, N-1$, $k=0, 1, 2, \ldots, N-1$, $m=0, 1, 2, \ldots, N-1$, where $y_{m,k}(n)$ is the second synchronization signal sequence, $g_{m,k}(n)$ may be the Gold sequence, $f_1(n)$ and $f_2(n)$ are m-sequences, m is the relative shift value between the sequence $f_1(n)$ and the sequence $f_2(n)$. When $f_1(n)$ and $f_2(n)$ are a preferred m-sequence pair, $g_{m,k}(n)$ is the Gold sequence.

It may be understood that, to avoid strong correlation between sequences for two synchronization signal, the cyclic shift value p used for an m-sequence in a second synchronization signal sequence does not include the cyclic shift value k corresponding to a sequence having a maximum correlation value with a sequence for a first synchronization signal. A correlation value between two sequences having a same length is defined as an absolute value of a sum of products of conjugates of elements at a same location. For example, when K=7 and N=127, for any one of 127 relative shift values, m=0, 1, 2, ..., 126. The cyclic shift value k that the second synchronization signal sequence needs to avoid is {20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20, 16, 30, 91, 95, 25, 78, 20}.

502. The network device obtains a first synchronization signal and a second synchronization signal.

The network device maps the first synchronization signal sequence onto N subcarriers in a first time unit to obtain the first synchronization signal, and maps the second synchronization signal sequence onto N subcarriers in a second time unit to obtain the second synchronization signal, where N is a positive integer greater than or equal to 1.

It should be noted that the first synchronization signal and the second synchronization signal that are obtained by the network device may be sequences obtained after modulation and transformation are performed on m-sequences, or may be directly generated according to a formula. The first synchronization signal satisfies $s(n)=1-2\cdot c(n)$, $n=0, 1, \ldots, N-1$, where N is a positive integer greater than 1, $s(n)$ is the first synchronization signal sequence, and $c(n)$ is the first m-sequence. The second synchronization signal is similar to the first synchronization signal, and details are not described herein again.

M=N or M=N−1. When M=N, N elements in a synchronization signal sequence are mapped onto N subcarriers. When M=N−1, elements other than a central element in a synchronization signal sequence are mapped onto N−1 subcarriers. A central element in a sequence of a synchronization signal may be mapped onto a central subcarrier of the synchronization signal in a frequency domain or may not be transmitted. This is not limited in the embodiments of the present invention.

It may be understood that the network device may modulate an m-sequence through binary phase shift keying (binary phase shift keying, BPSK), to obtain a modulated and transformed synchronization signal sequence. The network device may alternatively modulate the synchronization signal sequence by using another modulation scheme. This is not specifically limited herein.

503. The network device sends the first synchronization signal and the second synchronization signal.

The network device sends the first synchronization signal on a subcarrier carrying the first synchronization signal sequence, and sends the second synchronization signal on a subcarrier carrying the second synchronization signal sequence.

504. User equipment receives a first receive signal and a second receive signal.

The user equipment performs screening on a received signal, and chooses to receive the first receive signal and the second receive signal that satisfy a signal quality requirement.

In this embodiment of this application, step 503 and step 504 in which the user equipment transmits the synchronization signals are similar to step 203 and step 204 in FIG. 2, and details are not described herein again.

505. The user equipment generates local synchronization signal sequences.

The user equipment generates the local synchronization signal sequences. The local synchronization signal sequence includes a first local synchronization signal sequence and a second local synchronization signal sequence. The second local synchronization signal sequence is a sequence obtained based on the first m-sequence and the second m-sequence. The relative shift value between the first m-sequence and the second m-sequence of the second local synchronization signal sequence is obtained and is m. The cyclic shift value is p, and the value range of p does not include the cyclic shift value k strongly correlated to the first synchronization signal sequence.

It may be understood that the second local synchronization signal sequence may be obtained based on a Gold sequence. The Gold sequence is a sequence generated based on a first m-sequence $f_1(n)$ and a second m-sequence $f_2(n)$. The second local synchronization signal sequence satisfies $y_{m,k}(n)=1-2 \cdot g_{m,k}(n)$, $g_{m,k}(n)=(f_1((n+m+k) \bmod N)+f_2((n+k) \bmod N)) \bmod 2$, $n=0, 1, 2, \ldots, N-1$, $k=0, 1, 2, \ldots, N-1$, $m=0, 1, 2, \ldots, N-1$.

506. The user equipment processes the first receive signal and the second receive signal.

The user equipment processes the first receive signal and the second receive signal based on the local synchronization signal sequence. A local synchronization signal includes a first local synchronization signal and a second local synchronization signal.

It should be noted that a receive signal includes the first receive signal and the second receive signal, and the user equipment performs a correlation operation on the receive signal.

In this embodiment of this application, the first synchronization signal sequence and the second synchronization signal sequence that have small correlation value and that are generated by the network device, namely, a primary synchronization signal sequence and a secondary synchronization signal sequence, reduce cross-correlation between a secondary synchronization signal and a primary synchronization signal. In this way, when the user equipment detects a primary synchronization signal in a local cell, interference caused to the primary synchronization signal by a secondary synchronization signal in another cell or in the local cell can be reduced.

Figure 6:
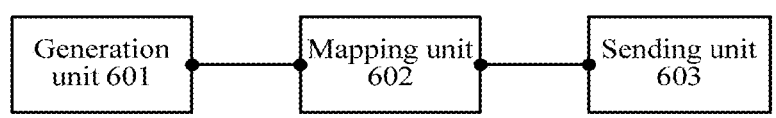
FIG. 6 is a schematic diagram of a network device according to an embodiment of this application.

Referring to FIG. 6, an embodiment of a network device in the embodiments of this application includes:

a generation unit 601, configured to generate a first synchronization signal sequence and a second synchronization signal sequence, where the first synchronization signal sequence is a sequence obtained based on a first m-sequence, the second synchronization signal sequence is a sequence obtained based on a first Gold sequence. The first Gold sequence is generated based on a second m-sequence and a third m-sequence, a generator polynomial of the first m-sequence is the same as a generator polynomial of the second m-sequence, and the first m-sequence, the second m-sequence, and the third m-sequence each have a length of N; a mapping unit 602, configured to: map the first synchronization signal sequence onto M subcarriers in a first time unit to obtain a first synchronization signal, and map the second synchronization signal sequence onto M subcarriers in a second time unit to obtain a second synchronization signal, where M and N are positive integers greater than 1; and a sending unit 603, configured to send the first synchronization signal and the second synchronization signal.

This embodiment of the present invention provides a method for generating a synchronization signal. The synchronization signal may include the first synchronization signal and the second synchronization signal. The first synchronization signal and the second synchronization signal may be the first synchronization signal and the second synchronization signal mentioned in the embodiments of this application. For example, the first synchronization signal may be a primary synchronization signal, and the second synchronization signal may be a secondary synchronization signal. The first synchronization signal is generated based on a first synchronization signal sequence. The second synchronization signal is generated based on a second synchronization signal sequence.

In a possible implementation, the first synchronization signal sequence $s(n)$ satisfies $s(n)=1-2 \cdot c(n)$, $n=0, 1, 2, \ldots, N-1$, where $c(n)$ is the first m-sequence. The generator polynomial of the first m-sequence $\{c(n)|n=0, 1, 2, \ldots, N-1\}$ is $g_1(x)=\Sigma_{i=0}^{K} a_i \cdot x^i$, where $a_K=1$, $a_0=1$, K is a positive integer greater than or equal to 1, and $0 \le i \le K$. $c((n+K) \bmod N)=(\Sigma_{i=1}^{K-1} a_i \cdot c((n+i) \bmod N)+c(n)) \bmod 2$, $n=0, 1, 2, \ldots, N-K-1$. The generator polynomial of the first m-sequence $c(n)$ is $g(x)=x^7+x^4+1$. A recursion formula is $c(n+7)=(c(n+4)+c(n)) \bmod 2$.

In a possible implementation, the second synchronization signal sequence $y_{m,k}(n)$ satisfies $y_{m,k}(n)=1-2 \cdot g_{m,k}(n)$, $n=0, 1, 2, \ldots, N-1$, where $g_{m,k}(n)$ is the sequence obtained based on the second m-sequence $\{f_1(n)|n=0, 1, 2, \ldots, N-1\}$ and the third m-sequence $\{f_2(n)|n=0, 1, 2, \ldots, N-1\}$. For example, $g_{m,k}(n)$ may be a Gold sequence. The generator polynomial of the second m-sequence is $g_2(x)=\Sigma_{i=0}^{K} b_i \cdot x^i$, a generator polynomial of the third m-sequence is $g_3(x)=\Sigma_{i=0}^{K} c_i \cdot x^i$, where $b_K=1$, $b_0=1$, $c_K=1$, $c_0=1$, K is a positive integer greater than or equal to 1, and $0 \le i \le K$. $g_{m,k}(n)=(f_1((n+m+k) \bmod N)+f_2((n+k) \bmod N)) \bmod 2$, $n=0, 1, 2, \ldots, N-1$, $k=0, 1, 2, \ldots, N-1$, $m=0, 1, 2, \ldots, N-1$, where m is a relative shift value between the sequence $f_1(n)$ and the sequence $f_2(n)$, and k is a cyclic shift value.

In another possible implementation, the second synchronization signal sequence $y_{m,k}(n)$ satisfies $y_{m,k}(n)=x_1((n+m+k) \bmod N) \cdot x_2((n+k) \bmod N)$ (Formula 1), where $$x_1(n)=1-2 \cdot f_1(n) \qquad \text{(Formula 2);}$$

$$x_2(n)=1-2 \cdot f_2(n) \qquad \text{(Formula 3); and}$$

$n=0, 1, \ldots, N-1$, $k=0, 1, 2, \ldots, N-1$, $m=0, 1, 2, \ldots, N-1$, $f_1(n)$ is the second m-sequence, and $f_2(n)$ the third m-sequence.

It may be understood that the formula 2 and the formula 3 may be substituted into the formula 1, to obtain:

$$y_{m,k}(n)=[1-2 \cdot f_1((n+m+k) \bmod N)] \cdot [1-2 \cdot f_2((n+k) \bmod N)] \qquad \text{(Formula 4)}$$

For simplicity, m+k may be considered as $k_1$, that is, $k_1=m+k$. In this case, the formula 4 may also be represented as:

$$y_{m,k}(n)=[1-2 \cdot f_1((n+k_1) \bmod N)] \cdot [1-2 \cdot f_2((n+k) \bmod N)] \qquad \text{(Formula 5), where}$$

$n=0, 1, \ldots, N-1$, $k=0, 1, 2, \ldots, N-1$, and $k_1=0, 1, 2, \ldots, 2(N-1)$, that is, n is an integer less than or equal to N−1, k is an integer less than or equal to N−1, and $k_1$ is an integer less than or equal to 2(N−1).

In a possible implementation, the generator polynomial of the first m-sequence $\{c(n)|n=0, 1, 2, \ldots, N-1\}$ is the same as the generator polynomial of the second m-sequence $f_1(n)$. For example, the generator polynomial of the first m-sequence is $g(x)=x^7+x^4+1$, and the recursion formula is $c(n+7)=(c(n+4)+c(n)) \bmod 2$; and the generator polynomial of the second m-sequence is $g(x)=x+x^4+1$, and a recursion formula is $f_1(n+7)=(f_1(n+4)+f_1(n))\mod 2$.

The first synchronization signal sequence and the second synchronization signal sequence that are obtained in this embodiment have a small correlation value. That is, a primary synchronization signal sequence and a secondary synchronization signal sequence have a small correlation value. Therefore, cross-correlation between a secondary synchronization signal and a primary synchronization signal can be reduced, thereby reducing interference caused to a primary synchronization signal by a secondary synchronization signal in another cell or in a local cell.

Figure 7:
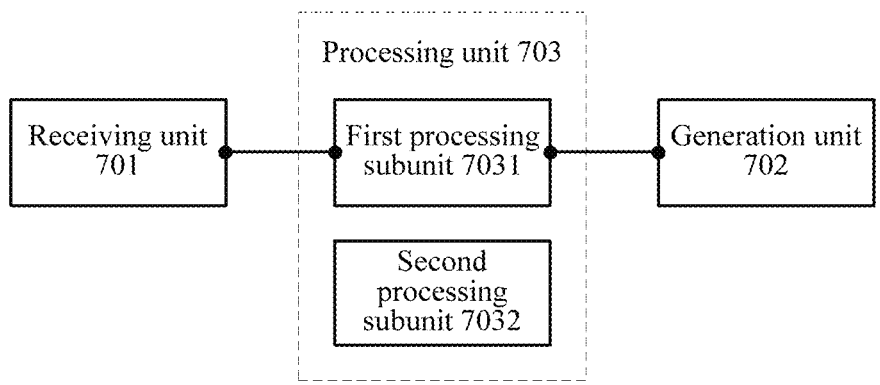
FIG. 7 is a schematic diagram of user equipment according to an embodiment of this application.

Referring to FIG. 7, another embodiment of user equipment in the embodiments of this application includes a receiving unit 701, a generation unit 702, a processing unit 703:

The receiving unit 701, configured to receive a first receive signal and a second receive signal;

The generation unit 702, configured to generate local synchronization signal sequences, where the local synchronization signal sequences includes a first local synchronization signal sequence and a second local synchronization signal sequence. The first local synchronization signal sequence is a sequence obtained based on a first m-sequence. The second local synchronization signal sequence is a sequence obtained based on a first Gold sequence, the first Gold sequence is generated based on a second m-sequence and a third m-sequence, a generator polynomial of the first m-sequence is the same as a generator polynomial of the second m-sequence, and the first m-sequence, the second m-sequence, and the third m-sequence each have a length of N, where N is a positive integer greater than 1; and The processing unit 703, configured to process the first receive signal and the second receive signal based on the local synchronization signal sequence.

Optionally, the processing unit 703 may further include:

a first processing subunit 7031, configured to perform correlation processing on the first receive signal based on the first local synchronization signal sequence; and a second processing subunit 7032, configured to perform correlation processing on the second receive signal based on the second local synchronization signal sequence.

Optionally, the first processing subunit 7031 may be specifically configured to:

perform correlation processing on the first receive signal based on the first local synchronization signal sequence, where the first local synchronization signal sequence is the sequence obtained based on the first m-sequence. The first local synchronization signal sequence $s(n)$ satisfies $s(n)=1-2\cdot c(n)$, $n=0, 1, 2, \ldots, N-1$, where $c(n)$ is the first m-sequence. The generator polynomial of the first m-sequence $\{c(n)|n=0, 1, 2, \ldots, N-1\}$ is $g_1(x)=\Sigma_{i=0}^{K}a_i\cdot x^i$, where $a_K=1$, $a_0=1$, K is a positive integer greater than or equal to 1, and $0\leq i\leq K$. $c((n+K)\mod N)=(\Sigma_{i=1}^{K-1}a_i\cdot c((n+i)\mod N)+c(n))\mod 2$, $n=0, 1, 2, \ldots, N-K-1$. The generator polynomial of the first m-sequence $c(n)$ is $g(x)=x+x^4+1$. A recursion formula is $c(n+7)=(c(n+4)+c(n))\mod 2$.

Optionally, the first local synchronization signal sequence may alternatively be generated in a manner of generating the first synchronization signal sequence in the foregoing embodiments. For details, refer to related descriptions in the foregoing embodiments. Details are not described herein again.

Optionally, the second processing subunit 7032 may be specifically configured to: perform correlation processing on the second receive signal based on the second local synchronization signal sequence.

In an implementation, the second local synchronization signal sequence is the sequence obtained based on the first Gold sequence. The first Gold sequence is generated based on a second m-sequence $\{f_1(n)|n=0, 1, 2, \ldots, N-1\}$ and a third m-sequence $\{f_2(n)|n=0, 1, 2, \ldots, N-1\}$. The generator polynomial of the second m-sequence is $g_2(x)=\Sigma_{i=0}^{K}b_i\cdot x^i$, and a generator polynomial of the third m-sequence is $g_3(x)=\Sigma_{i=0}^{K}c_i\cdot x^i$, where $b_K=1$, $b_0=1$, $c_K=1$, $c_0=1$, K is a positive integer greater than or equal to 1, and $0\leq i\leq K$. The first Gold sequence, the second m-sequence, and the third m-sequence satisfy $y_{m,k}(n)=1-2\cdot g_{m,k}(n)$, $g_{m,k}(n)=(f_1((n+m+k)\mod N)+f_2((n+k)\mod N))\mod 2$, $n=0, 1, 2, \ldots, N-1$, $k=0, 1, 2, \ldots, N-1$, $m=0, 1, 2, \ldots, N-1$, where $y_{m,k}(n)$ is the second synchronization signal sequence, $g_{m,k}(n)$ is the first Gold sequence, m is a relative shift value between the sequence $f_1(n)$ and the sequence $f_2(n)$, and k is a cyclic shift value.

In another implementation, the second local synchronization signal sequence $y_{m,k}(n)$ satisfies:

$$y_{m,k}(n)=x_1((n+m+k)\mod N)\cdot x_2((n+k)\mod N),$$

where $x_1(n)=1-2\cdot f_1(n)$, $x_2(n)=1-2\cdot f_2(n)$, $n=0, 1, \ldots, N-1$, $k=0, 1, 2, \ldots, N-1$, $m=0, 1, 2, \ldots, N-1$, $f_1(n)$ is the second m-sequence, and $f_2(n)$ is the third m-sequence.

It may be understood that $y_{m,k}(n)$ may also be represented as:

$$y_{m,k}(n)=[1-2\cdot f_1((n+m+k)\mod N)]\cdot[1-2\cdot f_2((n+k)\mod N)].$$

For simplicity, m+k may be considered as $k_1$, that is, $k_1=m+k$. In this case, $y_{m,k}(n)$ may also be represented as:

$$y_{m,k}(n)=[1-2\cdot f_1((n+k_1)\mod N)]\cdot[1-2\cdot f_2((n+k)\mod N)] \quad \text{(Formula 5)},$$

where $n=0, 1, \ldots, N-1$, $k=0, 1, 2, \ldots, N-1$, $k_1=0, 1, 2, \ldots, 2(N-1)$, that is, n is an integer less than or equal to $N-1$, k is an integer less than or equal to $N-1$, and $k_1$ is an integer less than or equal to $2(N-1)$.

In a possible implementation, the generator polynomial of the first m-sequence $\{c(n)|n=0, 1, 2, \ldots, N-1\}$ is the same as the generator polynomial of the second m-sequence $f_1(n)$. For example, the generator polynomial of the first m-sequence is $g(x)=x^7+x^4+1$, and the recursion formula is $c(n+7)=(c(n+4)+c(n))\mod 2$; and the generator polynomial of the second m-sequence is $g(x)=x+x^4+1$, and a recursion formula is $f_1(n+7)=(f_1(n+4)+f_1(n))\mod 2$.

Optionally, the second local synchronization signal sequence may alternatively be generated in a manner of generating the first synchronization signal sequence in the foregoing embodiments. For details, refer to related descriptions in the foregoing embodiments. Details are not described herein again.

In this embodiment of this application, the user equipment processes the first receive signal and the second receive signal respectively by using the generated first local synchronization signal sequence and second local synchronization signal sequence that have a small correlation value, that is, the user equipment processes the first reception signal and the second reception signal respectively by using a local primary synchronization signal sequence and a local secondary synchronization signal sequence, to reduce a probability of false detection of a local secondary synchronization signal and a local primary synchronization signal, thereby improving performance of detecting the first receive signal and the second receive signal.

Figure 8:
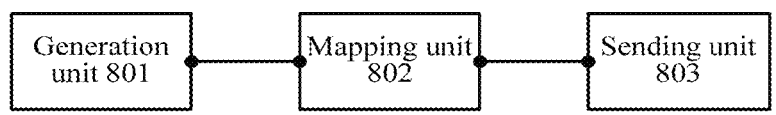
FIG. 8 is a schematic diagram of a network device according to another embodiment of this application.

Referring to FIG. 8, another embodiment of a network device in the embodiments of this application includes a generation unit 801, a mapping unit 802, a sending unit 803:

The generation unit 801, configured to generate a first synchronization signal sequence and a second synchronization signal sequence, where the first synchronization signal sequence is a sequence obtained based on a first Gold sequence. The first Gold sequence is a sequence generated based on a first m-sequence and a second m-sequence. The second synchronization signal sequence is a sequence obtained based on a second Gold sequence. The second Gold sequence is a sequence generated based on a third m-sequence and a fourth m-sequence, generator polynomials of the first m-sequence and the third m-sequence are the same, generator polynomials of the second m-sequence and the fourth m-sequence are the same. A relative shift value between the first m-sequence and the second m-sequence is $m_1$, a relative shift value between the third m-sequence and the fourth m-sequence is $m_2$, $m_1 \neq m_2 \pmod N$, and the first m-sequence, the second m-sequence, the third m-sequence, and the fourth m-sequence each have a length of N;

The mapping unit 802, configured to: map the first synchronization signal sequence onto M subcarriers in a first time unit to obtain a first synchronization signal, and map the second synchronization signal sequence onto M subcarriers in a second time unit to obtain a second synchronization signal, where M and N are positive integers greater than 1; and The sending unit 803, configured to send the first synchronization signal and the second synchronization signal.

Optionally, the first synchronization signal sequence is the sequence obtained based on the first Gold sequence, the first Gold sequence is the sequence generated based on a first m-sequence $f_1(n)$ and a second m-sequence $f_2(n)$. The second synchronization signal sequence is the sequence obtained based on the second Gold sequence, the second Gold sequence is the sequence generated based on a third m-sequence $f_3(n)$ and a fourth m-sequence $f_4(n)$, and the first Gold sequence, the first m-sequence, and the second m-sequence satisfy $y_{m,k}(n)=1-2 \cdot g_{m,k}(n)$, $g_{m,k}(n)=(f_1((n+m+k) \mod N)+f_2((n+k) \mod N)) \mod 2$, where $y_{m,k}(n)$ is the first synchronization signal sequence, $g_{m,k}(n)$ is the first Gold sequence, and the relative shift value between the first m-sequence and the second m-sequence is $m_1$. The second Gold sequence, the third m-sequence, and the fourth m-sequence satisfy $y_{m,k}(n)=1-2 \cdot g_{m,k}(n)$, $g_{m,k}(n)=(f_3((n+m+k) \mod N)+f_4((n+k) \mod N)) \mod 2$, where $y_{m,k}(n)$ is the second synchronization signal sequence, $g_{m,k}(n)$ is the second Gold sequence, and the relative shift value between the third m-sequence and the fourth m-sequence is $m_2$, where $n=0, 1, 2, \ldots, N-1$, $k=0, 1, 2, \ldots, N-1$, $m=0, 1, 2, \ldots, N-1$, and k is a cyclic shift value. The generator polynomials of the first m-sequence and the third m-sequence are the same and are $g_1(x)=\Sigma_{i=0}^{K} a_i \cdot x^i$, $a_K=1$, $a_0=1$, the generator polynomials of the second m-sequence and the fourth m-sequence are the same and are $g_2(x)=\Sigma_{i=0}^{K} b_i \cdot x^i$, $b_K=1$, $b_0=1$, and $m_1 \neq m_2 \pmod N$ is satisfied.

Optionally, the first synchronization signal sequence satisfies $y_{m,k}(n)=x_1((n+m+k) \mod N) \cdot x_2((n+k) \mod N)$, $x_1(n)=1-2 \cdot f_1(n)$, $x_2(n)=1-2 \cdot f_2(n)$, $n=0, 1, \ldots, N-1$, $k=0, 1, 2, \ldots, N-1$, $m=0, 1, 2, \ldots, N-1$, where $y_{m,k}(n)$ is the first synchronization signal sequence, $f_1(n)$ is the first m-sequence, and $f_2(n)$ is the second m-sequence.

It should be noted that the first synchronization signal sequence and the second synchronization signal sequence in this embodiment may be sequences described with reference to the foregoing embodiments.

For example, the first synchronization signal sequence $s(n)$ satisfies $s(n)=1-2 \cdot c(n)$, $n=0, 1, 2, \ldots, N-1$, where $c(n)$ is the first m-sequence. The generator polynomial of the first m-sequence $\{c(n)|n=0, 1, 2, \ldots, N-1\}$ is $g_1(x)=\Sigma_{i=0}^{K} a_i \cdot x^i$, where $a_K=1$, $a_0=1$, K is a positive integer greater than or equal to 1, and $0 \leq i \leq K$. $c((n+K) \mod N)=(\Sigma_{i=0}^{K-1} a_i \cdot c((n+i) \mod N)+c(n)) \mod 2$, $n=0, 1, 2, \ldots, N-K-1$.

For another example, the second synchronization signal sequence $y_{m,k}(n)$ satisfies $y_{m,k}(n)=x_1((n+m+k) \mod N) \cdot x_2((n+k) \mod N)$, where $x_1(n)=1-2 \cdot f_1(n)$, $x_2(n)=1-2 \cdot f_2(n)$, $n=0, 1, \ldots, N-1$, $k=0, 1, 2, \ldots, N-1$, $m=0, 1, 2, \ldots, N-1$, $f_1(n)$ is the second m-sequence, and $f_2(n)$ is the third m-sequence. $y_{m,k}(n)$ may also be represented as $y_{m,k}(n)=[1-2 \cdot f_1((n+m+k) \mod N)] \cdot [1-2 \cdot f_2((n+k) \mod N)]$. For simplicity, m+k may be considered as $k_1$, that is, $k_1=m+k$. In this case, $y_{m,k}(n)$ may also be represented as:

$$y_{m,k}(n)=[1-2 \cdot f_1((n+k_1) \mod N)] \cdot [1-2 \cdot f_2((n+k) \mod N)],$$

where $n=0, 1, \ldots, N-1$, $k=0, 1, 2, \ldots, N-1$, $k_1=0, 1, 2, \ldots, 2(N-1)$, that is, n is an integer less than or equal to N−1, k is an integer less than or equal to N−1, and $k_1$ is an integer less than or equal to 2(N−1).

In this embodiment of this application, the network device generates the first synchronization signal sequence and the second synchronization signal sequence that have a small correlation value, namely, a primary synchronization signal sequence and a secondary synchronization signal sequence, to reduce cross-correlation between a secondary synchronization signal and a primary synchronization signal, thereby reducing interference caused to a primary synchronization signal by a secondary synchronization signal in another cell or in a local cell.

Figure 9:
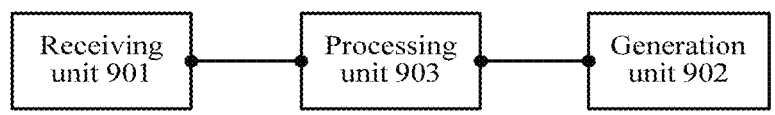
FIG. 9 is a schematic diagram of user equipment according to another embodiment of this application.

Referring to FIG. 9, another embodiment of user equipment in the embodiments of this application includes a receiving unit 901, a generation unit 902 and a processing unit 903. The receiving unit 901 is configured to receive a first receive signal and a second receive signal.

The generation unit 902 is configured to generate local synchronization signal sequences, where the local synchronization signal sequences includes a first local synchronization signal sequence and a second local synchronization signal sequence. The first local synchronization signal sequence is a sequence obtained based on a first Gold sequence. The first Gold sequence is a sequence generated based on a first m-sequence and a second m-sequence. The second local synchronization signal sequence is a sequence obtained based on a second Gold sequence. The second Gold sequence is a sequence generated based on a third m-sequence and a fourth m-sequence. Generator polynomials of the first m-sequence and the third m-sequence are the same. Generator polynomials of the second m-sequence and the fourth m-sequence are the same. A relative shift value between the first m-sequence and the second m-sequence is $m_1$, and a relative shift value between the third m-sequence and the fourth m-sequence is $m_2$, where $m_1 \neq m_2 \pmod N$. The first m-sequence, the second m-sequence, the third m-sequence, and the fourth m-sequence each have a length of N, and N is a positive integer greater than 1.

The processing unit 903 is configured to process the first receive signal and the second receive signal based on the local synchronization signal sequence.

Optionally, the first local synchronization signal sequence is a sequence obtained based on the first Gold sequence, the first Gold sequence is the sequence generated based on the first m-sequence $f_1(n)$ and the second m-sequence $f_2(n)$. The second local synchronization signal sequence is a sequence obtained based on the second Gold sequence. The second Gold sequence is the sequence generated based on the third m-sequence $f_3(n)$ and the fourth m-sequence $f_4(n)$, and the first Gold sequence, the first m-sequence, and the second m-sequence satisfy $y_{m,k}(n)=1-2\cdot g_{m,k}(n)$, $g_{m,k}(n)=(f_1((n+m+k)\mod N)+f_2((n+k)\mod N))\mod 2$, where $y_{m,k}(n)$ is the first synchronization signal sequence, $g_{m,k}(n)$ is the first Gold sequence, and the relative shift value between the first m-sequence and the second m-sequence is $m_1$. The second Gold sequence, the third m-sequence, and the fourth m-sequence satisfy $y_{m,k}(n)=1-2\cdot g_{m,k}(n)$, $g_{m,k}(n)=(f_3((n+m+k)\mod N)+f_4((n+k)\mod N))\mod 2$, where $y_{m,k}(n)$ is the second synchronization signal sequence, $g_{m,k}(n)$ is the second Gold sequence, and the relative shift value between the third m-sequence and the fourth m-sequence is $m_2$, where n=0, 1, 2, ..., N−1, k=0, 1, 2, ..., N−1, m=0, 1, 2, ..., N−1, and k is a cyclic shift value. The generator polynomials of the first m-sequence and the third m-sequence are the same and are $g_1(x)=\Sigma_{i=0}^{K}a_i\cdot x^i$, $a_K=1$, $a_0=1$, the generator polynomials of the second m-sequence and the fourth m-sequence are the same and are $g_2(x)=\Sigma_{i=0}^{K}b_i\cdot x^i$, $b_K=1$, $b_0=1$, and $m_1 \neq m_2 (\mod N)$ is satisfied.

It may be understood that, for the first local synchronization signal sequence, the second local synchronization signal sequence, the first m-sequence, the second m-sequence, the third m-sequence, and the like in this embodiment, refer to related descriptions in the foregoing embodiments.

In this embodiment of this application, the user equipment processes the first receive signal and the second receive signal respectively by using the generated first local synchronization signal sequence and second local synchronization signal sequence that have a small correlation value, that is, the user equipment processes the first reception signal and the second reception signal respectively by using a local primary synchronization signal sequence and a local secondary synchronization signal sequence, to reduce a probability of false detection of a local secondary synchronization signal and a local primary synchronization signal, thereby improving performance of detecting the first receive signal and the second receive signal.

Figure 10:
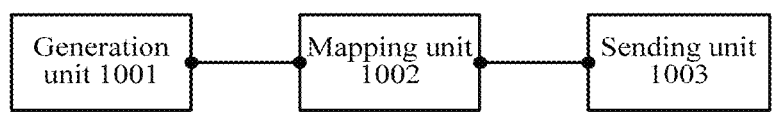
FIG. 10 is a schematic diagram of a network device according to another embodiment of the present invention.

Referring to FIG. 10, another embodiment of a network device in the embodiments of this application includes:

a generation unit 1001, configured to generate a first synchronization signal sequence and a second synchronization signal sequence, where the second synchronization signal sequence is a sequence obtained based on a first m-sequence and a second m-sequence. A relative shift value between the first m-sequence and the second m-sequence is m, a cyclic shift value is p, a value range of p does not include a cyclic shift value k strongly correlated to the first synchronization signal sequence, and the first m-sequence and the second m-sequence each have a length of N. A mapping unit 1002, configured to: map the first synchronization signal sequence onto M subcarriers in a first time unit to obtain a first synchronization signal, and map the second synchronization signal sequence onto M subcarriers in a second time unit to obtain a second synchronization signal, where M and N are positive integers greater than 1. A sending unit 1003, configured to send the first synchronization signal and the second synchronization signal.

In this embodiment of this application, the network device generates the first synchronization signal sequence and the second synchronization signal sequence that have a small correlation value, namely, a primary synchronization signal sequence and a secondary synchronization signal sequence, to reduce cross-correlation between a secondary synchronization signal and a primary synchronization signal, thereby reducing interference caused to a primary synchronization signal by a secondary synchronization signal in another cell or in a local cell.

Figure 11:
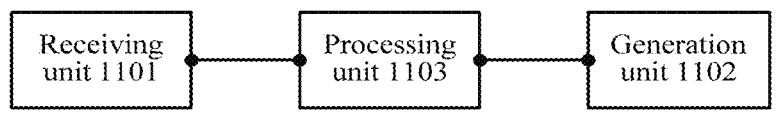
FIG. 11 is a schematic diagram of user equipment according to another embodiment of this application.

Referring to FIG. 11, another embodiment of user equipment in the embodiments of this application includes a receiving unit 1101, a generation unit 1102 and a processing unit 1103:

The receiving unit 1101, configured to receive a first receive signal and a second receive signal. The generation unit 1102, configured to generate local synchronization signal sequences, where the local synchronization signal sequences includes a first local synchronization signal sequence and a second local synchronization signal sequence. The second local synchronization signal sequence is a sequence obtained based on a first m-sequence and a second m-sequence. A relative shift value between the first m-sequence and the second m-sequence is m, a cyclic shift value is p, a value range of p does not include a cyclic shift value k strongly correlated to the first synchronization signal sequence, the first m-sequence and the second m-sequence each have a length of N, and N is a positive integer greater than 1. The processing unit 1103, configured to process the first receive signal and the second receive signal based on the local synchronization signal sequence.

It may be understood that, for the first synchronization signal sequence, the second synchronization signal sequence, and the like in this embodiment, refer to related descriptions in the foregoing embodiments.

In this embodiment of this application, the user equipment processes the first receive signal and the second receive signal respectively by using the generated first local synchronization signal sequence and second local synchronization signal sequence that have a small correlation value, that is, the user equipment processes the first reception signal and the second reception signal respectively by using a local primary synchronization signal sequence and a local secondary synchronization signal sequence, to reduce a probability of false detection of a local secondary synchronization signal and a local primary synchronization signal, thereby improving performance of detecting the first receive signal and the second receive signal.

In the embodiments, the first synchronization signal is a primary synchronization signal, and the second synchronization signal is a secondary synchronization signal. The first local synchronization signal is a local primary synchronization signal, and the second local synchronization signal is a local secondary synchronization signal. The primary synchronization signal is used to determine basic time and frequency synchronization or a channel center. The secondary synchronization signal is used to determine cell identification information.

FIG. 6 to FIG. 11 describe the network device and the user equipment in the embodiments of this application in detail from a perspective of a modular function entity, and the following describes the network device and the user equipment in the embodiments of this application in detail from a perspective of hardware processing.

Figure 12A:
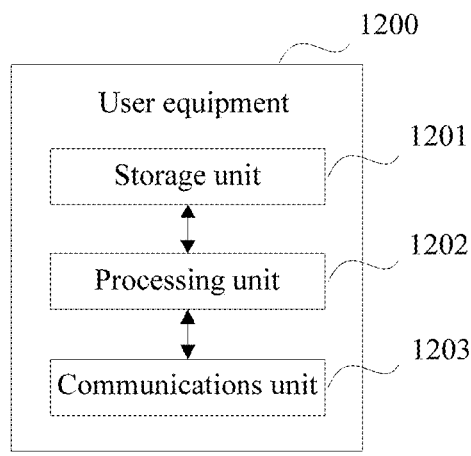
FIG. 12a is a schematic diagram of user equipment according to another embodiment of this application.

FIG. 12a is a schematic structural diagram of user equipment according to an embodiment of this application. Referring to FIG. 12a, when an integrated unit is used, FIG. 12a is a possible schematic structural diagram of the user equipment in the foregoing embodiments. The user equipment 1200 includes a processing unit 1202 and a communications unit 1203. The processing unit 1202 is configured to control and manage an action of the user equipment. For example, the processing unit 1202 is configured to support the user equipment in performing step 201 and step 202 in FIG. 2, and/or configured to perform another process in a technology described in this specification. The communications unit 1203 is configured to support the user equipment in communicating with another network entity. The user equipment may further include a storage unit 1201, configured to store program code and data of the user equipment. Optionally, the storage unit 1201 may store various m-sequences, synchronization signal sequences, synchronization signals, generator polynomials, or recursion formulas mentioned in the foregoing embodiments, parameters used to generate the synchronization signals or the synchronization signal sequences, or the like.

The processing unit 1202 may be a processor or a controller, for example, may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logical device, a transistor logical device, a hardware component, or any combination thereof. The processing unit 1202 can implement or perform various examples of logic blocks, modules, and circuits described with reference to content disclosed in this application. The processor may also be a combination that implements a computation function, for example, including one or more microprocessors or a combination of a plurality of microprocessors, or a combination of a DSP and a microprocessor. The communications unit 1203 may be a communications interface, a transceiver, a transceiver circuit, or the like. The communications interface is a collective term, and may include one or more interfaces, for example, transceiver interfaces. The storage unit 1201 may be a memory.

Figure 12B:
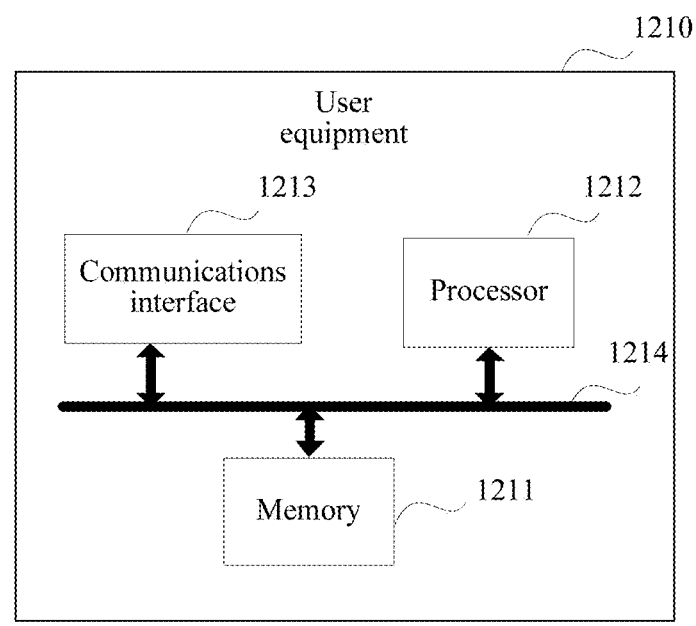
FIG. 12b is a schematic diagram of user equipment according to another embodiment of this application.

When the processing unit 1202 is a processor, the communications unit 1203 is a communications interface, and the storage unit 1201 is a memory, the user equipment in this embodiment of this application may be user equipment shown in FIG. 12*b*.

Referring to FIG. 12*b*, the user equipment 1210 includes a processor 1212, a communications interface 1213, and a memory 1211. Optionally, the user equipment 1210 may further include a bus 1214. The communications interface 1213, the processor 1212, and the memory 1211 may be connected by using the bus 1214. The bus 1214 may be a peripheral component interconnect (peripheral component interconnect, PCI) bus, an extended industry standard architecture (extended industry standard architecture, EISA) bus, or the like. The bus 1214 may be classified into an address bus, a data bus, a control bus, and the like. For convenience of representation, only one bold line is used for representation in FIG. 12*b*, but it does not indicate that there is only one bus or one type of bus. Optionally, the memory 1211 may store various m-sequences, synchronization signal sequences, synchronization signals, generator polynomials, or recursion formulas mentioned in the foregoing embodiments, parameters used to generate the synchronization signals or the synchronization signal sequences, or the like.

Figure 13:
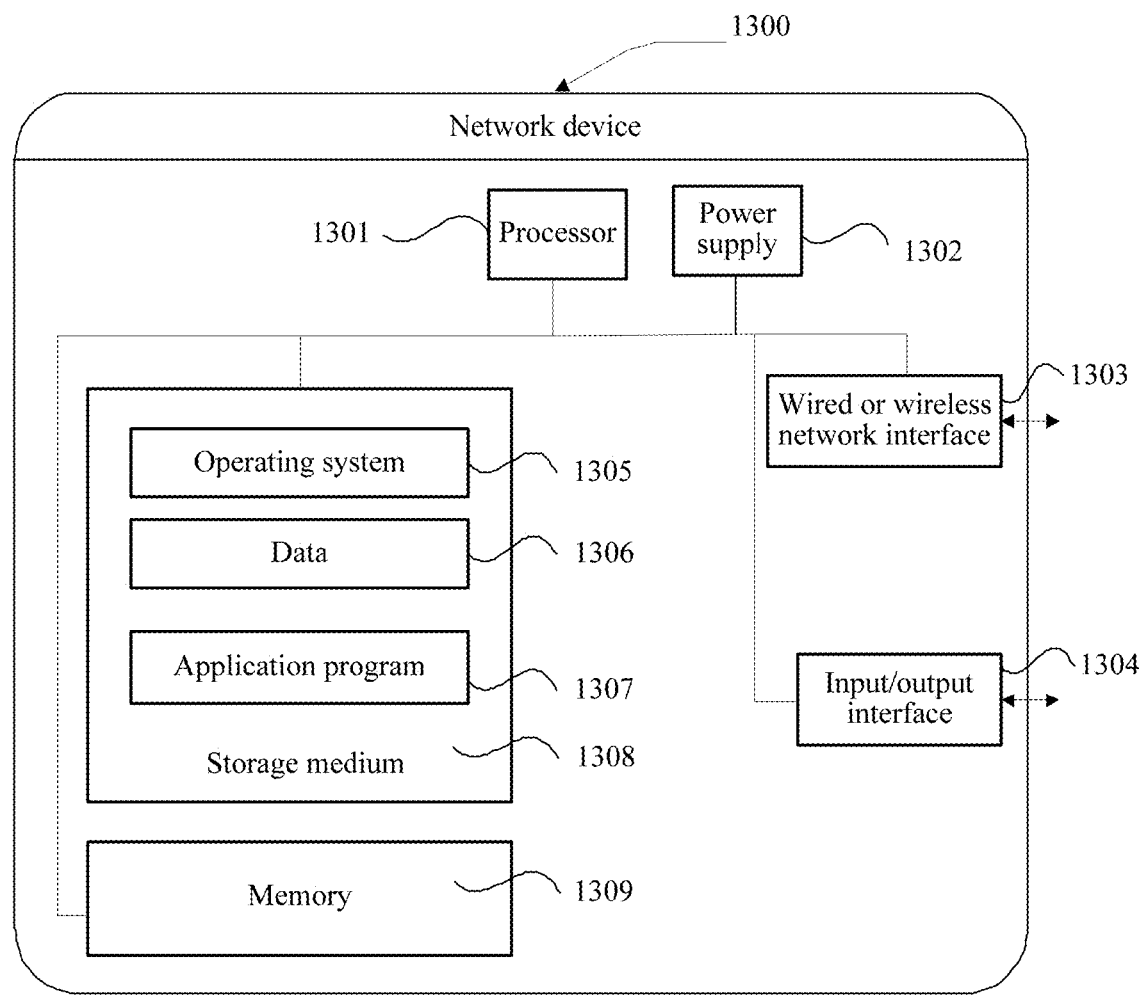
FIG. 13 is a schematic diagram of a network device according to another embodiment of this application.

FIG. 13 is a schematic structural block diagram of a network device according to an embodiment of this application. Referring to FIG. 13, FIG. 13 is a schematic structural diagram of a network device according to an embodiment of this application. There may be a great difference for the network device 1300 due to different configurations or performance. The network device 1300 may include one or more central processing units (Central processing units, CPU) 1301 (for example, one or more processors), one or more memories 1309, and one or more storage media 1308 (for example, one or more mass storage devices) for storing application programs 1307 or data 1306. The memory 1309 and the storage medium 1308 may be transient storages or persistent storages. A program stored in the storage medium 1308 may include one or more modules (not shown), and each module may include a series of instruction operations in a server. Further, the processor 1301 may be configured to communicate with the storage medium 1308, and perform a series of instruction operations in the storage medium 1308 in the network device 1300. Optionally, the memory 1309 or the storage medium 1308 may store various m-sequences, synchronization signal sequences, synchronization signals, generator polynomials, or recursion formulas mentioned in the foregoing embodiments, parameters used to generate the synchronization signals or the synchronization signal sequences, or the like.

The network device 1300 may further include one or more power supplies 1302, one or more wired or wireless network interfaces 1303, one or more input/output interfaces 1304, and/or one or more operating systems 1305 such as Windows Server™, Mac OS X™, Unix™, Linux™, and FreeBSD™.

All or some of the foregoing embodiments may be implemented through software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It may be clearly understood by persons skilled in the art that, for the purpose of convenient and brief description, for a detailed working process of the foregoing system, apparatus, and unit, refer to a corresponding process in the foregoing method embodiments. The foregoing embodiments may be referenced or supplemented to each other. Understanding is not affected and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

The invention claimed is:

1. An apparatus for wireless communication, comprising:
a communication unit, configured to receive a primary synchronization signal and a secondary synchronization signal,
wherein the primary synchronization signal is based on a primary synchronization signal sequence s(n), and the primary synchronization signal sequence s(n) is based on a sequence c(n), 0≤n≤126, a recursion formula of the sequence c(n) satisfies: c(n+7)=(c(n+4)+c(n))mod 2 and the primary synchronization signal sequence s(n) satisfies one of
(n)=1−2·c((n)mod 127);
s(n)=1−2·c((n+43)mod 127); or
s(n)=1−2·c((n+86)mod 127);
wherein the secondary synchronization signal is based on a secondary synchronization signal sequence, and the secondary synchronization signal sequence is based on a sequence $f_1(n)$ and a sequence $f_2(n)$, wherein the sequence $f_1(n)$ has a same recursion formula as the sequence c(n) and the recursion formula of the sequence $f_2(n)$ satisfies: c(n+7)=(c(n+1)+c(n))mod 2, 127 subcarriers in a first orthogonal frequency division multiplexing (OFDM) symbol are for the primary synchronization signal sequence s(n), and 127 subcarriers in a second OFDM symbol are for the secondary synchronization signal sequence;
a processor, configured to obtain cell identification information based on the primary synchronization signal and the secondary synchronization signal.

2. The apparatus according to claim 1, wherein the sequence c(n) satisfies: {c(6), c(5), c(4), c(3), c(2), c(1), c(0)}={1,1,1,0,1,1,0}.

3. The apparatus according to claim 1, wherein the sequence c(n) is:
{1 1 1 1 1 1 1 0 0 0 0 1 1 1 0 1 1 1 1 0 0 1 0 1 1 0 0 1
0 0 1 0 0 0 1 0 0 1 1 0 0 0 1 0 1 1 1 0 1 0 1 1 0 1 1
0 0 0 0 0 1 1 0 0 1 1 0 1 0 1 0 0 1 1 1 0 0 1 1 1 0 0
1 1 1 1 0 1 1 0 1 0 0 0 0 1 0 0 1 0 0 1 0 1 1 1 1 1 0
1 0 0 1 0 1 0 0 1 1 1 0 0 1 1 1 1 0 1 1 0}.

4. The apparatus according to claim 1, wherein a generator polynomial of the sequence $f_1(n)$ is $g(x)=x^7+x^4+1$, and a generator polynomial of the sequence $f^2(n)$ is $g(x)=x^7+x+1$.

5. The apparatus according to claim 1, wherein the secondary synchronization signal sequence y(n) satisfies:
y(n)=$x_1$((n+m+k)modN)·$x_2$((n+k)modN);
wherein $x_1(n)=1-2·f_1(n)$, $x_2(n)=1-2·f_2(n)$, and
N=127, n=0,1,2, . . . , N−1, k=0,1,2, . . . , N−1, m=0,1,2, . . . , N−1.

6. The apparatus according to claim 1, wherein the processor is further configured to generate a first local synchronization signal sequence and a second local synchronization signal sequence;
the communication unit is further configured to receive a first signal and a second signal; and
the processor is further configured to process the received first signal according to the first local synchronization signal sequence to detect the primary synchronization signal, and process the received second signal according to the second local synchronization signal sequence to detect the secondary synchronization signal.

7. The apparatus according to claim 1, wherein the processor is further configured to:
obtain a first local synchronization signal sequence based on the sequence c(n); and
detect the primary synchronization signal based on the first local synchronization signal sequence.

8. The apparatus according to claim 7, wherein the processor is further configured to:
obtain a second local synchronization signal sequence based on the sequence $f_1(n)$ and the sequence $f_2(n)$; and
detect the secondary synchronization signal based on the second local synchronization signal sequence.

9. The apparatus according to claim 1, wherein the secondary synchronization signal sequence is a gold sequence based on the sequence $f_1(n)$ and the sequence $f_2(n)$.

10. The apparatus according to claim 1, wherein one or more of the following sequences are m sequences:
the sequence c(n);
the sequence $f_1(n)$; or
the sequence $f_2(n)$.

11. The apparatus according to claim 1, wherein the secondary synchronization signal sequence y(n) satisfies:
$y_{m,k}(n)=1-2g_{m,k}(n)$; and
wherein $g_{m,k}(n)=\{(f)_1((n+m+k)modN)+f_2((n+k)modN))$ mod 2, N=127, n=0,1,2, . . . , N−1, k=0,1,2, . . . , N−1, m=0,1,2, . . . , N−1.

12. The apparatus according to claim 1, wherein the primary synchronization signal and the secondary synchronization signal have a same central frequency.

13. A method for wireless communication, the method comprising:
   receiving a primary synchronization signal and a secondary synchronization signal,
   wherein the primary synchronization signal is based on a primary synchronization signal sequence s(n), and the first synchronization signal sequence s(n) is based on a sequence c(n), 0≤n≤126, a recursion formula of the sequence c(n) satisfies: c(n+7)=(c(n+4)+c(n))mod 2 and the primary synchronization signal sequence s(n) satisfies one of:
   s(n)=1−2·c((n)mod 127);
   s(n)=1−2·c((n+43)mod 127); or
   s(n)=1−2·c((n+86)mod 127);
   wherein the secondary synchronization signal is based on a secondary synchronization signal sequence, and the secondary synchronization signal sequence is based on a sequence $f_1(n)$ and a sequence $f_2(n)$, wherein the sequence $f_1(n)$ has a same recursion formula as the sequence c(n) and the recursion formula of the sequence $f_2(n)$ satisfies: c(n+7)=(c(n+1)+c(n))mod 2, 127 subcarriers in a first orthogonal frequency division multiplexing (OFDM) symbol are for the primary synchronization signal sequence s(n), and 127 subcarriers in a second OFDM symbol are for the secondary synchronization signal sequence;
   obtaining cell identification information based on the primary synchronization signal and the secondary synchronization signal.

14. The method according to claim 13, wherein the sequence c(n) satisfies: {c(6), c(5), c(4), c(3), c(2), c(1), c(0)}={1,1,1,0,1,1,0}.

15. The method according to claim 13, wherein the secondary synchronization signal sequence y(n) satisfies:
   y(n)=$x_1$((n+m+k)modN)·$x_2$((n+k)modN);
   wherein $x_1(n)$=1−2 $f_1(n)$, $x_2(n)$=1−2·$f_2(n)$; and
   N=127, n=0,1,2, . . . , N−1, k=0,1,2, . . . , N−1, m=0,1,2, . . . , N−1.

16. The method according to claim 13, wherein the secondary synchronization signal sequence is a gold sequence based on the sequence $f_1(n)$ and the sequence $f_2(n)$.

17. The method according to claim 13, wherein one or more of the following sequences are m sequences:
   the sequence c(n);
   the sequence $f_1(n)$; or
   the sequence $f_2(n)$.

18. The method according to claim 13, wherein the secondary synchronization signal sequence y(n) satisfies:
   $y_{m,k}(n)$=1−2·$g_{m,k}(n)$; and
   wherein $g_{m,k}(n)$={(f)$_1$((n+m+k)modN)+$f_2$((n+k)modN)) mod 2, N=127, n=0,1,2, . . . , N−1, k=0,1,2, . . . , N−1, =0,1,2, . . . , N−1.

19. The method according to claim 13, wherein the primary synchronization signal and the secondary synchronization signal have same central frequency.

20. A non-transitory computer-readable medium, comprising instructions that, when executed by one or more processors, cause an apparatus to to:
   receive a primary synchronization signal and a secondary synchronization signal,
   wherein the primary synchronization signal is based on a primary synchronization signal sequence s(n), and the primary synchronization signal sequence s(n) is based on a sequence c(n), 0≤n≤126, a recursion formula of the sequence c(n) satisfies: c(n+7)=(c(n+4)+c(n))mod 2 and the primary synchronization signal sequence s(n) satisfies one of:
   s(n)=1−2·c((n)mod 127);
   s(n)=1−2·c((n+43)mod 127); or
   s(n)=1−2·c((n+86)mod 127);
   wherein the secondary synchronization signal is based on a secondary synchronization signal sequence, and the secondary synchronization signal sequence is based on a sequence $f_1(n)$ and a sequence $f_2(n)$, wherein the sequence $f_1(n)$ has a same recursion formula as the sequence c(n) and the recursion formula of the sequence $f_2(n)$ satisfies: c(n+7)=(c(n+1)+c(n))mod 2, 127 subcarriers in a first orthogonal frequency division multiplexing (OFDM) symbol are for the primary synchronization signal sequence s(n), and 127 subcarriers in a second OFDM symbol are for the secondary synchronization signal sequence; and
   obtain cell identification information based on the primary synchronization signal and the secondary synchronization signal.

21. The non-transitory computer-readable medium according to claim 20, wherein the sequence c(n) satisfies: {c(6), c(5), c(4), c(3), c(2), c(1), c(0)}={1,1,1,0,1,1,0}.

22. The non-transitory computer-readable medium according to claim 20, wherein the sequence c(n) is:
   {1 1 1 1 1 1 1 0 0 0 0 1 1 1 0 1 1 1 1 0 0 1 0 1 1 0 0 1 0 0 1 0 0 0 1 0 0 1 1 0 0 0 1 0 1 1 1 0 1 0 1 1 0 1 1 0 0 0 0 0 1 1 0 0 1 1 0 1 0 1 0 0 1 1 1 0 0 1 1 1 0 0 1 1 1 1 0 1 1 0 1 0 0 0 0 1 0 0 1 0 0 1 0 1 1 1 1 1 0 1 0 0 1 0 1 0 0 1 1 1 0 0 1 1 1 1 0 1 1 0}.

23. The non-transitory computer-readable medium according to claim 20, wherein a generator polynomial of the sequence $f_1(n)$ is $g(x)=x^7+x^4+1$, and a generator polynomial of the sequence $f_2(n)$ is $g(x)=x^7+x+1$.

24. The non-transitory computer-readable medium according to claim 20, wherein the secondary synchronization signal sequence y(n) satisfies:
   y(n)=$x_1$((n+m+k)modN)·$x_2$((n+k)modN);
   wherein $x_1(n)$=1−2$f_1(n)$, $x_2(n)$=1−2·$f_2(n)$; and
   N=127, n=0,1,2, . . . , N−1, k=0,1,2, . . . , N−1, m=0,1,2, . . . , N−1.

25. The non-transitory computer-readable medium according to claim 20, wherein the secondary synchronization signal sequence is a gold sequence based on the sequence $f_1(n)$ and the sequence $f_2(n)$.

26. The non-transitory computer-readable medium according to claim 20, wherein one or more of the following sequences are m sequences:
   the sequence c(n);
   the sequence $f_1(n)$; or
   the sequence $f_2(n)$.

27. The non-transitory computer-readable medium according to claim 20, wherein the secondary synchronization signal sequence y(n) satisfies:
   $y_{m,k}(n)$=1−2·$g_{m,k}(n)$; and
   wherein $g_{m,k}(n)$={(f)$_1$ ((n+m+k)modN)+$f_2$((n+k)modN)) mod 2, N=127, n=0,1,2, . . . , N−1, k=0,1,2, . . . , N−1, k=0,1,2, . . . , N−1.

28. The non-transitory computer-readable medium according to claim 20, wherein the primary synchronization signal and the secondary synchronization signal have a same central frequency.

29. A communication device, comprising:
   a transceiver, configured to receive a primary synchronization signal and a secondary synchronization signal from a network device, the primary synchronization signal being based on a first synchronization sequence s(n); the secondary synchronization signal being based on a second synchronization sequence y(n) that satisfies:

$y(n)=[1-2 \cdot f_1((n+k_1) \bmod 127)] \cdot [1-2 \cdot f_2((n+k) \bmod 127)]$, wherein n is an integer, n=0,1, ... 126, k is an integer and k<127, and $k_1$ is an integer and $k_1$<253, and $f_1(n)$ and $f_2(n)$ are sequences; and a processor, configured to obtain cell identification information based on the primary synchronization signal and the second synchronization signal.

30. The device according to claim 29, wherein the first synchronization sequence s(n) is based on a first sequence c(n), a recursion formula of the sequence c(n) satisfies: $c(n+7)=(c(n+4)+c(n)) \bmod 2$.

31. The device according to claim 29, wherein one of sequences $f_1(n)$ or $f_2(n)$ has a same recursion formula as the sequence c(n).

\* \* \* \* \*

UNITED STATES PATENT AND TRADEMARK OFFICE
CERTIFICATE OF CORRECTION

PATENT NO. : 11,991,650 B2  
APPLICATION NO. : 17/658534  
DATED : May 21, 2024  
INVENTOR(S) : Qu et al.

Page 1 of 3

It is certified that error appears in the above-identified patent and that said Letters Patent is hereby corrected as shown below:

In the Specification

In Column 3, Line 6, delete "$y_{m,k}(n)$" and insert -- $g_{m,k}(n)$ --.

In Column 3, Line 16, delete "mod N)-$x_2$" and insert -- mod N)·$x_2$ --.

In Column 3, Line 22, delete "mod N) $x_2$" and insert -- mod N)·$x_2$ --.

In Column 4, Line 64, delete "$x_1(n+m+k)$" and insert -- $x_1((n+m+k)$ --.

In Column 5, Line 32, delete "$m_1\ m_2$" and insert -- $m_1 \neq m_2$ --.

In Column 6, Line 11, delete "$m_1 \cdot m_2$" and insert -- $m_1 \neq m_2$ --.

In Column 6, Line 24, delete "1-2 $f_2(n)$" and insert -- 1-2·$f_2(n)$ --.

In Column 7, Line 55, delete "1-2 $f_2(n)$" and insert -- 1-2·$f_2(n)$ --.

In Column 7, Line 58, delete "N)][1-2" and insert -- N)]·[1-2 --.

In Column 9, Line 61, delete "$(\Sigma_{i=0}^{K-1}$" and insert -- $(\Sigma_{i=1}^{K-1}$ --.

In Column 10, Line 24, delete "$x_1(n+m+k)$" and insert -- $x_1((n+m+k)$ --.

In Column 11, Line 33, delete "$(\Sigma_{i=0}^{K-1}$" and insert -- $(\Sigma_{i=1}^{K-1}$ --.

In Column 12, Line 5, delete "$y_{m,k}(n) \cdot x_1$" and insert -- $y_{m,k}(n)=x_1$ --.

In Column 14, Line 58, delete "1-2 $f_2(n)$" and insert -- 1-2·$f_2(n)$ --.

Signed and Sealed this  
Tenth Day of December, 2024

Katherine Kelly Vidal  
*Director of the United States Patent and Trademark Office*

CERTIFICATE OF CORRECTION (continued)
U.S. Pat. No. 11,991,650 B2

In Column 17, Line 14, delete "mod N) x$_2$" and insert -- mod N)·x$_2$ --.

In Column 20, Line 60, delete "x$_2$+x$^4$+1," and insert -- x$^7$+x$^4$+1, --.

In Column 21, Line 23, delete "x$_7$+x$^3$+1" and insert -- x$^7$+x$^3$+1 --.

In Column 22, Line 47, delete "n-sequence" and insert -- m-sequence --.

In Column 22, Line 47, delete "x$^1$," and insert -- x$^i$, --.

In Column 22, Line 54, after "sequence," delete "n" and insert -- m --.

In Column 23, Line 13, delete "x+x$^4$+1." and insert -- x$^7$+x$^4$+1. --.

In Column 23, Lines 19-21, delete "{1 1 1 1 1 1 0 0 0 0 1 1 1 1 1 1 1 0 0 0 1 0 1 1 0 0 1 0 0 1 0 0 0 0 1 1 0 0 0 0" and insert -- {1 1 1 1 1 1 0 0 0 0 1 1 1 0 1 1 1 1 0 0 1 0 1 1 0 0 1 0 0 1 0 0 0 1 0 0 1 1 0 0 0 1 0 --.

In Column 23, Line 32, delete "x+x$^4$+1." and insert -- x$^7$+x$^4$+1. --.

In Column 23, Line 43, delete "x+x$^6$" and insert -- x$^7$+x$^6$ --.

In Column 23, Line 67, delete "N=2K-1." and insert -- N=2$^K$-1. --.

In Column 24, Line 5, after "g$_{m,k}$(n)=" delete "(f" and insert -- (f$_1$ --.

In Column 24, Line 9, delete "(n). g$_{m,k}$(n)" and insert -- (n)·g$_{m,k}$(n) --.

In Column 24, Line 61, delete "1}" and insert -- 1 0} --.

In Column 32, Line 57, delete "mod (Formula 5), where" and insert -- $modN$)] (Formula 5), where --.

In Column 33, Line 1, delete "x+x$^4$+1," and insert -- x$^7$+x$^4$+1, --.

In Column 33, Line 56, delete "x+x$^4$+1." and insert -- x$^7$+x$^4$+1. --.

In Column 34, Line 44, delete "x+x$^4$+1," and insert -- x$^7$+x$^4$+1, --.

In Column 35, Line 56, delete "(n+m+k)" and insert -- ((n+m+k) --.

In Column 36, Line 3, delete "($\Sigma_{i=0}^{K-1}$" and insert -- ($\Sigma_{i=1}^{K-1}$ --.

In the Claims

In Column 41, in Claim 1, Line 52, delete "o≤n≤126," and insert -- 0≤n≤126, --.

CERTIFICATE OF CORRECTION (continued)
U.S. Pat. No. 11,991,650 B2

In Column 41, in Claim 1, Line 56, delete "(n)=" and insert -- $s(n)=$ --.

In Column 42, in Claim 3, Line 13, delete "{1 1" and insert -- {1 --.

In Column 42, in Claim 3, Line 16, delete "1 0 0 1 0 0 1 0" and insert -- 1 0 1 0 1 0 --.

In Column 42, in Claim 4, Line 20, delete "f²(n)" and insert -- $f_2(n)$ --.

In Column 42, in Claim 11, Line 61, delete "1-2$g_{m,k}(n)$;" and insert -- $1\text{-}2\cdot g_{m,k}(n)$; --.

In Column 43, in Claim 13, Line 8, delete "o≤n≤126," and insert -- 0≤n≤126, --.

In Column 43, in Claim 13, Line 18, delete "$f_2$ (n)," and insert -- $f_2(n)$, --.

In Column 43, in Claim 15, Line 36, delete "1-2 $f_1(n)$," and insert -- $1\text{-}2\cdot f_1(n)$, --.

In Column 43, in Claim 18, Line 49, delete "1=2" and insert -- 1-2 --.

In Column 43, in Claim 18, Line 52, delete "=0,1,2," and insert -- m=0,1,2, --.

In Column 43, in Claim 20, Line 64, delete "o≤n≤126," and insert -- 0≤n≤126, --.

In Column 44, in Claim 20, Line 7, delete "$f_2$ (n)," and insert -- $f_2(n)$, --.

In Column 44, in Claim 22, Line 25, delete "{1 1" and insert -- {1 --.

In Column 44, in Claim 22, Line 28, delete "1 0 0 1 0 0 1 0" and insert -- 1 0 1 0 1 0 --.

In Column 44, in Claim 24, Line 39, delete "1-2$f_1(n)$," and insert -- $1\text{-}2\cdot f_1(n)$, --.

In Column 44, in Claim 27, Line 58, delete "k=0,1,2," and insert -- m=0,1,2, --.